(12) United States Patent
Isaac et al.

(10) Patent No.: US 11,427,097 B2
(45) Date of Patent: Aug. 30, 2022

(54) CHARGING PORTS WITH INTEGRATED CONTACTLESS COMMUNICATION UNITS

(71) Applicant: Molex, LLC, Lisle, IL (US)

(72) Inventors: Roger D. Isaac, San Jose, CA (US); Alan Besel, Ridgefield, WA (US)

(73) Assignee: Molex, LLC, Lisle, IL (US)

( * ) Notice: Subject to any disclaimer, the term of this patent is extended or adjusted under 35 U.S.C. 154(b) by 20 days.

(21) Appl. No.: 16/587,864

(22) Filed: Sep. 30, 2019

(65) Prior Publication Data

US 2020/0044493 A1    Feb. 6, 2020

Related U.S. Application Data

(63) Continuation of application No. 15/685,371, filed on Aug. 24, 2017, now Pat. No. 10,468,919.

(Continued)

(51) Int. Cl.
*B60L 53/14* (2019.01)
*H01R 13/62* (2006.01)
(Continued)

(52) U.S. Cl.
CPC ............... *B60L 53/14* (2019.02); *B60L 53/16* (2019.02); *B60L 53/305* (2019.02); *B60L 53/65* (2019.02);
(Continued)

(58) Field of Classification Search
CPC .. B60L 2270/38; B60L 2270/40; B60L 53/14; B60L 53/16; B60L 53/305;
(Continued)

(56) References Cited

U.S. PATENT DOCUMENTS

| | | |
|---|---|---|
| 5,806,018 A | 9/1998 | Smith et al. |
| 7,766,663 B2 | 8/2010 | Yazawa et al. |

(Continued)

FOREIGN PATENT DOCUMENTS

| | | |
|---|---|---|
| CN | 105359118 A | 2/2016 |
| EP | 2112468 A1 | 10/2009 |

(Continued)

OTHER PUBLICATIONS

International Preliminary Report on Patentability received for PCT Application No. PCT/US2017/048460, dated Mar. 7, 2019, 8 pages.

(Continued)

*Primary Examiner* — Atul Trivedi

(57) ABSTRACT

Embodiments discussed herein refer to electric vehicle charging ports having integrated contactless communication units (CCUs). The electric vehicle charging ports include male and female connector assemblies that can be coupled together in a manner that enables consistent and reliable operation of contactless communications and power transfer. The connector integrates power and alignment such that when two connector assemblies are coupled together, power connections are made in combination with establishing contactless communications links between counterpart CCUs in both connector assemblies. The fixed alignment of the connector assemblies ensures that contactless communication channels, spanning between the connector assemblies, are aligned to enable consistent and reliable operation of contactless communications. The CCUs, which conduct contactless communications, may be integrated in the connector assemblies at fixed positions that enable CCUs of one connector assembly to be aligned with CCUs of another connector assembly when they are coupled together.

18 Claims, 17 Drawing Sheets

Related U.S. Application Data

(60) Provisional application No. 62/378,904, filed on Aug. 24, 2016.

(51) Int. Cl.

| | | |
|---|---|---|
| *H01R 13/66* | (2006.01) | |
| *B60L 53/16* | (2019.01) | |
| *B60L 53/65* | (2019.01) | |
| *B60L 53/30* | (2019.01) | |
| *H02J 7/00* | (2006.01) | |
| *H01R 12/71* | (2011.01) | |
| *H02J 50/80* | (2016.01) | |
| *H02J 50/90* | (2016.01) | |
| *H02J 50/10* | (2016.01) | |
| *H01F 38/14* | (2006.01) | |
| *H02J 7/02* | (2016.01) | |
| *H02J 7/04* | (2006.01) | |
| *H04B 5/00* | (2006.01) | |
| *H01F 27/36* | (2006.01) | |

(52) U.S. Cl.
CPC ......... *H01F 27/361* (2020.08); *H01F 27/363* (2020.08); *H01F 27/366* (2020.08); *H01F 38/14* (2013.01); *H01R 12/716* (2013.01); *H01R 13/6205* (2013.01); *H01R 13/6608* (2013.01); *H02J 7/00036* (2020.01); *H02J 7/0042* (2013.01); *H02J 7/025* (2013.01); *H02J 7/04* (2013.01); *H02J 50/10* (2016.02); *H02J 50/80* (2016.02); *H02J 50/90* (2016.02); *H04B 5/0031* (2013.01); *B60L 2270/38* (2013.01); *B60L 2270/40* (2013.01); *H01F 2038/143* (2013.01); *H01F 2038/146* (2013.01); *H02J 7/0013* (2013.01); *H02J 7/0027* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC .......... B60L 53/65; Y02T 90/12; Y02T 90/14; Y02T 90/16; Y02T 90/167; Y02T 90/169; Y02T 10/70; Y02T 10/7072; H02J 50/10; H02J 50/80; H02J 50/90; H02J 7/00036; H02J 7/0013; H02J 7/0027; H02J 7/0042; H02J 7/025; H02J 7/04; H01F 2038/143; H01F 2038/146; H01F 38/14; H01F 27/36; H01R 13/6205; H01R 13/6608; H01R 12/716; H04B 5/0031; Y04S 30/14
USPC .......................................................... 701/22
See application file for complete search history.

(56) References Cited

U.S. PATENT DOCUMENTS

| | | | |
|---|---|---|---|
| 8,316,237 B1 * | 11/2012 | Felsher | H04L 9/0825 |
| | | | 713/171 |
| 8,469,722 B2 | 6/2013 | Huang | |
| 8,515,865 B1 | 8/2013 | Marathe et al. | |
| 8,583,520 B1 | 11/2013 | Forbes, Jr. | |
| 9,371,007 B1 | 6/2016 | Penilla et al. | |
| 9,499,129 B1 | 11/2016 | Penilla et al. | |
| 9,634,728 B2 | 4/2017 | Hassan-Ali et al. | |
| 9,720,419 B2 | 8/2017 | O'Neill et al. | |
| 9,866,039 B2 | 1/2018 | Adolf et al. | |
| 10,018,744 B2 | 7/2018 | Roy et al. | |
| 10,025,306 B2 | 7/2018 | Bivans et al. | |
| 10,153,644 B2 | 12/2018 | DeVaul et al. | |
| 10,919,463 B1 * | 2/2021 | Brown | B60W 20/50 |
| 11,079,753 B1 * | 8/2021 | Roy | G05D 1/0038 |
| 2001/0022558 A1 | 9/2001 | Karr et al. | |
| 2008/0027602 A1 | 1/2008 | Yeap et al. | |
| 2011/0153367 A1 | 6/2011 | Amigo et al. | |
| 2012/0248888 A1 * | 10/2012 | Kesler | H02J 7/0029 |
| | | | 307/104 |
| 2012/0252231 A1 | 10/2012 | Kall | |
| 2014/0067490 A1 | 3/2014 | James et al. | |
| 2014/0067491 A1 | 3/2014 | James et al. | |
| 2014/0067660 A1 * | 3/2014 | Cornish | G06Q 20/145 |
| | | | 705/39 |
| 2014/0136013 A1 | 5/2014 | Wolverton et al. | |
| 2014/0136187 A1 | 5/2014 | Wolverton et al. | |
| 2015/0091503 A1 * | 4/2015 | Hyde | B60L 53/65 |
| | | | 320/108 |
| 2015/0091507 A1 * | 4/2015 | Hyde | B60L 53/65 |
| | | | 320/108 |
| 2015/0094888 A1 * | 4/2015 | Hyde | B60L 53/63 |
| | | | 701/22 |
| 2015/0111496 A1 * | 4/2015 | McCormack | H04B 5/02 |
| | | | 455/41.1 |
| 2015/0197155 A1 * | 7/2015 | Lu | H02J 50/90 |
| | | | 320/108 |
| 2015/0306967 A1 | 10/2015 | Cohen | |
| 2016/0087687 A1 * | 3/2016 | Kesler | H04B 5/0037 |
| | | | 307/104 |
| 2016/0129794 A1 * | 5/2016 | Huang | B60L 53/62 |
| | | | 320/108 |
| 2016/0241347 A1 | 8/2016 | McCormack et al. | |
| 2017/0123422 A1 | 5/2017 | Kentley et al. | |
| 2017/0136894 A1 * | 5/2017 | Ricci | B60L 50/53 |
| 2017/0269940 A1 | 9/2017 | Valasek et al. | |
| 2017/0297438 A1 * | 10/2017 | Park | H02J 50/90 |
| 2018/0376357 A1 | 12/2018 | Tavares Coutinho et al. | |
| 2019/0006891 A1 * | 1/2019 | Park | H04W 4/80 |
| 2020/0006952 A1 * | 1/2020 | Jang | H02J 7/00712 |
| 2020/0079237 A1 * | 3/2020 | Seong | B60L 53/12 |
| 2021/0101680 A1 * | 4/2021 | Naderi | B64C 39/024 |

FOREIGN PATENT DOCUMENTS

| | | | | |
|---|---|---|---|---|
| EP | 2983267 A1 | | 2/2016 | |
| EP | 3035713 A1 | * | 6/2016 | ............. H04W 4/80 |
| KR | 20170030424 A | * | 3/2017 | ............. H02J 50/10 |
| WO | 2013162844 A1 | | 10/2013 | |
| WO | 2015023781 A2 | | 2/2015 | |
| WO | WO-2015077544 A1 | * | 5/2015 | ............. B60L 50/40 |
| WO | WO-2016044747 A1 | * | 3/2016 | ............. B60L 53/665 |

OTHER PUBLICATIONS

International Search Report and Written Opinion received for PCT Application No. PCT/US2017/048460, dated Nov. 22, 2017, 10 pages.

\* cited by examiner

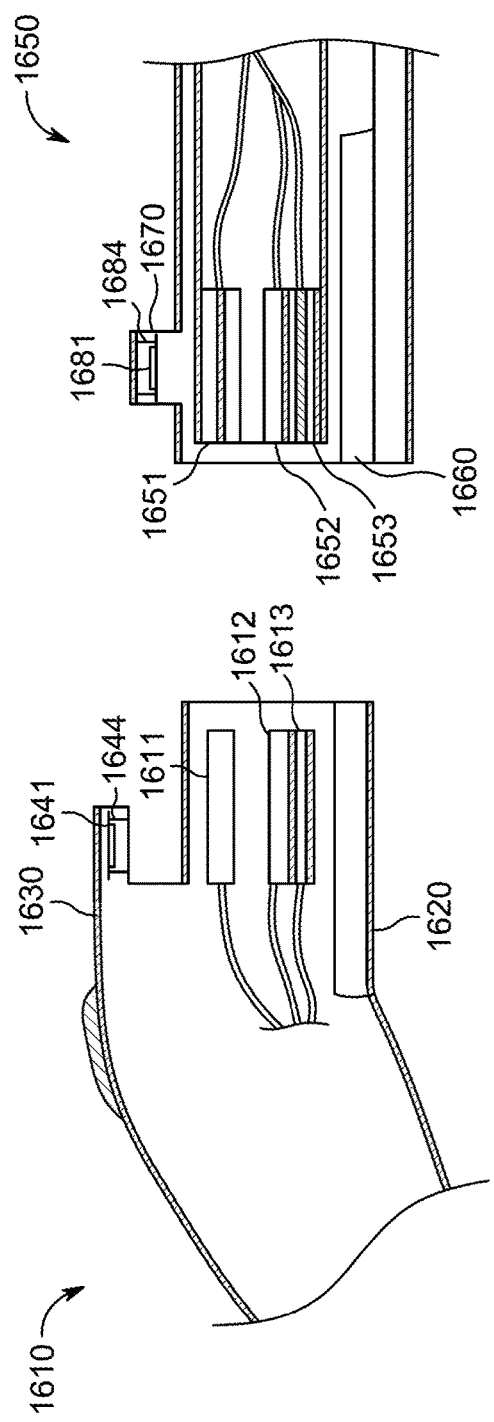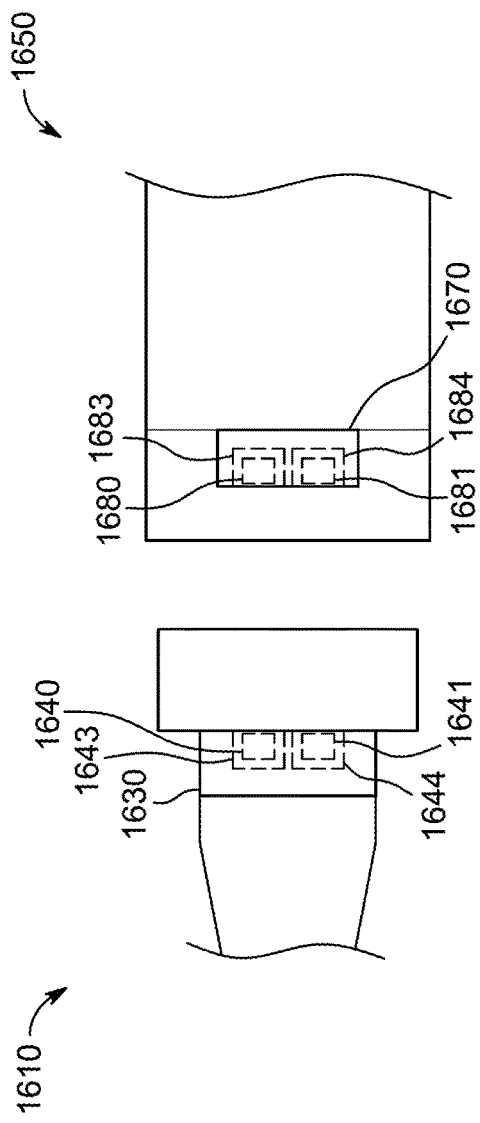
FIG. 16A
FIG. 16B

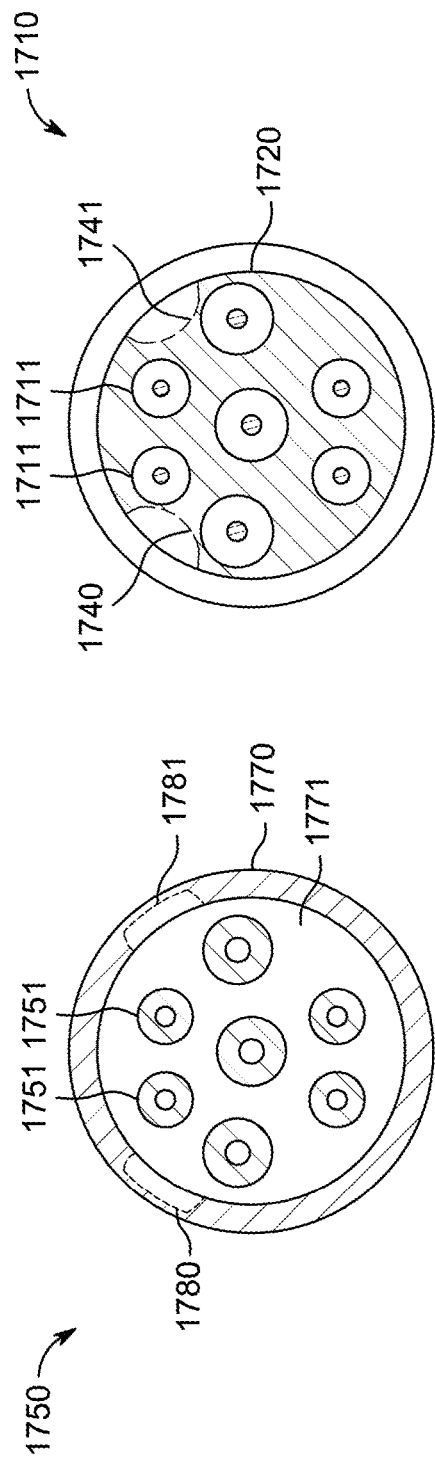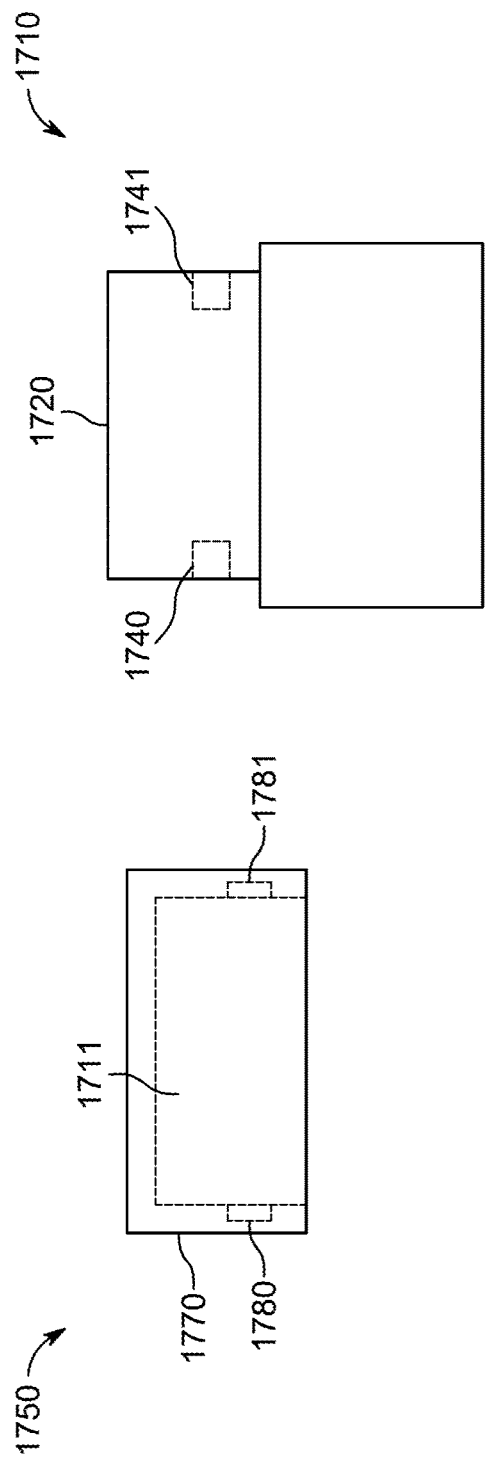
FIG. 17A
FIG. 17B

CHARGING PORTS WITH INTEGRATED CONTACTLESS COMMUNICATION UNITS

CROSS-REFERENCE TO A RELATED APPLICATION

This application is a continuation of U.S. patent application Ser. No. 15/685,371, filed Aug. 24, 2017, which claims priority to U.S. Provisional Application No. 62/378,904, filed Aug. 24, 2016, the disclosures of which are incorporated by reference in their entirety.

FIELD OF THE INVENTION

The present disclosure relates to charging ports, and more particularly to charging ports that incorporate extremely high frequency ("EHF") contactless communications.

BACKGROUND

A plug-in electric vehicle as that term is used herein is a full electric or hybrid electric vehicle that can be charged by plugging it into a charging station, commonly known as an Electric Vehicle Supply Equipment ("EVSE"). A "conductive charge coupler" may be used to connect an electrical power source to the electrical system of an electric is vehicle, to charge the vehicle battery. The purpose of the coupler is to transfer energy to charge the battery and operate other vehicle electrical systems, and to establish a reliable equipment grounding path between the vehicle and the supply equipment. The vehicle is typically equipped with an on-board charger capable of accepting energy from a single-phase AC supply network, converting the AC to DC, and regulating the supply voltage to a level that permits a managed charge rate based on the battery charge acceptance characteristics.

Many vehicles are outfitted with many sensors and processing power that enables them to amass a substantial amount of data. It may desirable for this data to be downloaded from the vehicle while it is connected to the EVSE.

BRIEF SUMMARY

Embodiments discussed herein refer to electric vehicle charging ports having integrated contactless communication units (CCUs). The electric vehicle charging ports include male and female connector assemblies that can be coupled together in a manner that enables consistent and reliable operation of contactless communications and power transfer. The connector integrates power and alignment such that when two connector assemblies are coupled together, power connections are made in combination with establishing contactless communications links between counterpart CCUs in both connector assemblies. The fixed alignment of the connector assemblies ensures that contactless communication channels, spanning between the connector assemblies, are aligned to enable consistent and reliable operation of contactless communications. The CCUs, which conduct contactless communications, may be integrated in the connector assemblies at fixed positions that enable CCUs of one connector assembly to be aligned with CCUs of another connector assembly when they are coupled together.

In one embodiment, an electric vehicle supply equipment (EVSE) for use with a vehicle is provided. The EVSE can include communications circuitry, data storage, control circuitry, and a first port connector operative to interface with a second port connector associated with the vehicle. The first connector includes a housing having a keyed outer surface that limits the interface between the first port connector and the second port connector to one orientation, one or more connectors operative to mechanically couple to one or more counterpart connectors in the second port connector, and at least one contactless communication unit (CCU) that establishes a contactless communications link with a respective one of the at least one CCU of the second port connector when the first and second port connectors are coupled together. After the first and second port connectors are coupled together, the control circuitry is operative to receive vehicle log data from the vehicle via the contactless communications link after the EVSE has been authenticated to the vehicle.

In another embodiment, an electric vehicle embodiment is provided. The electric vehicle can include sensors, system components, data storage, control circuitry, and a first port connector operative to interface with a second port connector associated with an external system. The first connector can include a housing having a keyed outer surface that limits the interface between the first port connector and the second port connector to one orientation, one or more connectors operative to mechanically couple to one or more counterpart connectors in the second port connector, and at least one contactless communication unit (CCU) that establishes a contactless communications link with a respective one of the at least one CCU of the second port connector when the first and second port connectors are coupled together. After the first and second port connectors are coupled together, the control circuitry is operative to transmit, from the data storage, vehicle log data to the external system via the contactless communications link.

A further understanding of the nature and advantages of the embodiments discussed herein may be realized by reference to the remaining portions of the specification and the drawings.

BRIEF DESCRIPTION OF THE DRAWINGS

FIGS. 16A and 16B show illustrative cross-sectional and top views of male and female connector assemblies, according to an embodiment;

FIGS. 17A and 17B show illustrative front and top views of male and female connector assemblies that adhere to a type 2 electric vehicle charging plug standard, according to an embodiment;

DETAILED DESCRIPTION

Figure 1:
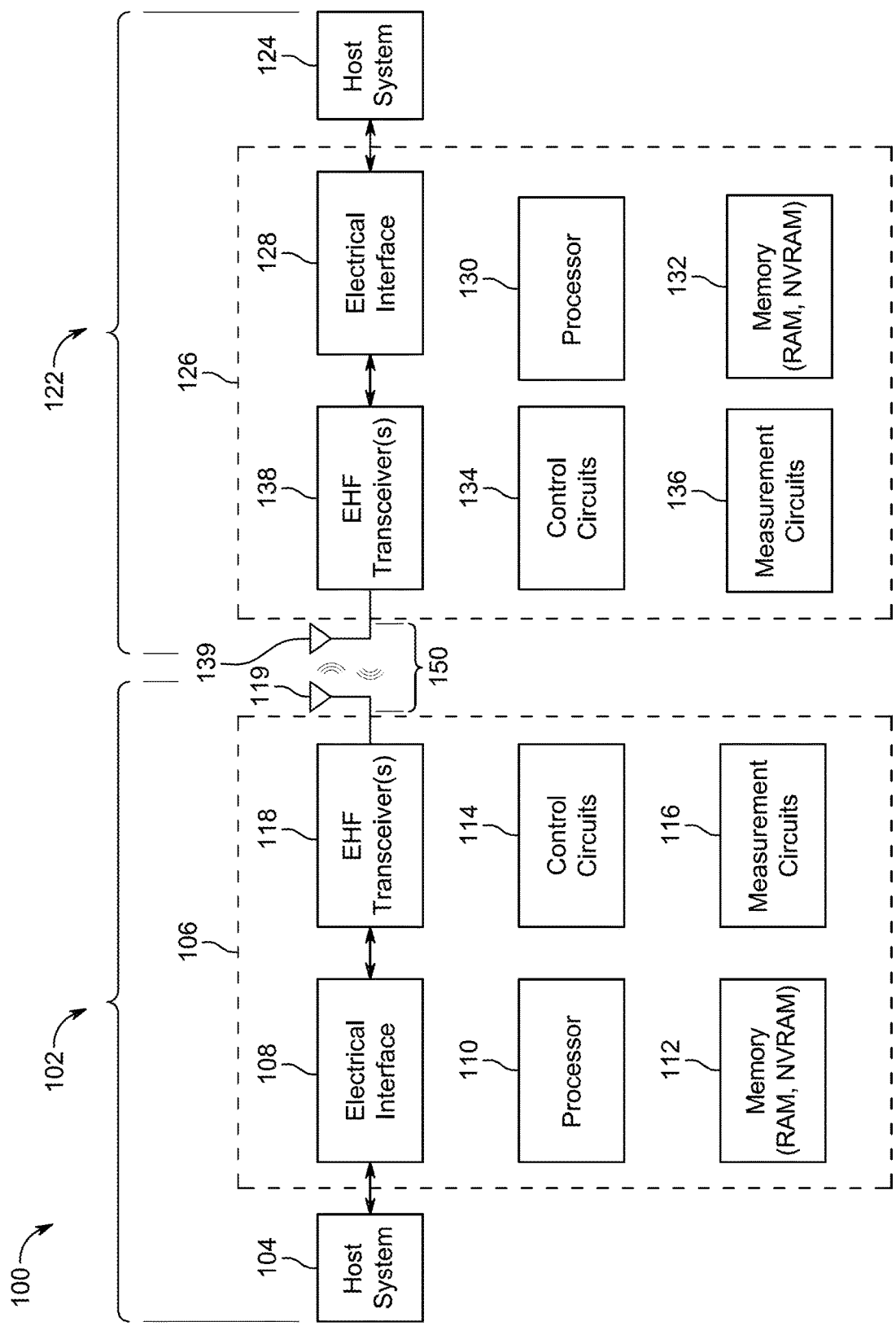
FIG. 1 illustrates a communications system, according to an embodiment.

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices are important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Comm-link chips are an example of a communication device, also referred to as contactless communication unit, a contactless communications transceiver unit (CCTV or EHF XCVR).

The term "transceiver" may refer to a device such as an integrated circuit ("IC") including a transmitter (Tx) and a receiver (Rx) so that the integrated circuit may be used to both transmit and receive information, such as data. Such a transceiver may be referred to herein as a CCU or an EHF XCVR. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic (EM) rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF XCVRs described herein may be designed to adhere to various requirements mandated by one or more governments or their agencies. For example, the FCC may promulgate requirements for certification for transmitting data in an RF frequency band.

"Standards" and related terms such as "Standards-based", "Standards-based interfaces", "Standards-based protocol", "interface protocols," and the like may refer to legacy interface standards which may include but are not limited to USB (e.g., USB 2, USB 3, USB 3/2, or USB OTG), DisplayPort (DP), Thunderbolt, HDMI, SATA/S AS, PCIe, Ethernet SGMII, Hypertransport, Quickpath, I2S, GPIO, I2C and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

When transferring data between EHF communication units, the transfer speed and quality are optimal when an Rx is placed in the signal path where the Tx radiates maximum signal strength. Thus, higher data transfer efficiency is realized when the Rx and Tx are properly aligned with respect to each other. In addition, use of a reflective lens according to embodiments discussed herein can further increase the efficiency of data transfer by focusing dispersal of the EM signal energy.

FIG. 1 illustrates a communications system 100, wherein two electronic device subsystems or devices 102 and 122 may communicate with one another over at least one contactless communications link 150. Data may be transferred in at least one direction, from first device 102, which may be regarded as a source for sending the data to be transferred, to second device 122, which may be regarded as a destination for receiving the data to be transferred. With reference to FIG. 1, the transfer of data from first device 102 to second device 122 may be described. However, it should be understood that data may alternatively or additionally be transferred from second device 122 (e.g., acting as a source for sending the data) to first device 102 (e.g., acting as a destination for receiving the data), and that information may also be exchanged in both directions between devices 102 and 122 during a given communications session.

For illustrative clarity, devices 102 and 122 will be described as mirror images of one another, but it should be understood that the two devices 102 and 122 may be different from each other. For example, one of the devices may be a laptop computer or surface computer and the other device may be a mobile telephone or other portable device. Some examples of electronic devices which may benefit from the techniques disclosed herein may include cellular telephones (or handsets, or smart phones), computers, docks (e.g., docking stations), laptops, tablets, or comparable electronic devices, to name but a few.

First electronic device 102 may include a host system 104 and a contactless communication unit 106, which may be an EHF contactless communication unit, a smart contactless connector, a communication subsystem, a smart connector, a contactless connector, or simply a connector 106. The unit 106 associated with first device 102 may be generally capable of performing at least one of establishing and managing operation of contactless link 150 with unit 126 of second device 122, monitoring and modifying data passing through unit 106 onto link 150, and/or interfacing with and providing application support for host system 104. These functions of unit 106, with regard to interacting with link 150, the data, and host system 104, may be described and elaborated upon and discussed in greater detail in this disclosure.

Unit 106 associated with first device 102 may include some or all of the following elements: electrical interface 108, processor 110 and associated memory 112, control circuits 114, measurement circuits 116, one or more transceivers 118, and/or one or more transducers 119. The operation of these various elements (108-119) may be described and elaborated upon and discussed in greater detail in this disclosure.

Second electronic device 122 may include host system 124 and a contactless communication unit 126, which may be an EHF contactless communication unit, a smart contactless connector, a communication subsystem, a smart connector, a contactless connector, or simply a connector 126. Connector 126 associated with second device 122 may be generally capable of establishing and managing operation of contactless link 150 with unit 106 of first device 102, monitoring and modifying data passing though the unit 126 onto link 150, and/or interfacing with and/or providing application support for host system 124. These functions of unit 126, with regard to interacting with link 150, the data, and the host system 124, may be described and elaborated upon and discussed in greater detail in this disclosure.

Unit 126 associated with second device 122 may include some or all of the following elements: an electrical interface 128, processor 130 and associated memory 132, control circuits 134, measurement circuits 136, one or more transceivers 138, and/or one or more transducers 139. The operation of these various elements (128-139) may be described and elaborated upon and discussed in greater detail in this disclosure.

Units 106 and 126 may operate without intervention from host processors (e.g., processors of host systems 104 and 124, respectively), and/or may take control of the host systems 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (e.g., in FIG. 1) around units 106 and 126 may simply represent "partitioning" of functions, separating (e.g., distinguishing) units 106 and 126 from host system 104 and 124, respectively. The antennae shown (e.g., symbolically as transducers 119 and 139) outside of the dashed-line rectangles may be considered to be within the functional blocks of units 106 and 126, but may be disposed either internal or external to a communications chip constituting the contactless connector (e.g., for receiving EHF contactless signals from another antennae/transducer (e.g., across link 150)). The dashed-line rectangles shown (e.g., in FIG. 1) around units 106 and 126 may also represent non-conducting barriers (e.g., housings, enclosures, or the like, not shown), such as plastic or acrylic enclosures for units 106 and 126 or could also include entire devices 102 and 122, respectively, as described hereinabove.

Electrical interfaces 108 and 128 may include communications port(s)/channel(s) to communicate with any suitable portion(s) of host systems 104 and 124, respectively. Host systems 104 and 124 may have their own processors and associated circuitry (e.g., as described below with respect to FIG. 2 but not shown in FIG. 1). As mentioned, devices 102 and 122 may be described as mirror images of one another, but it should be understood that the two devices 102 and 122, and/or the two host systems 104 and 124, may be different than each other. For example, one of the devices or host systems may be a laptop computer, and the other device or host system may be a mobile telephone or an adapter for a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

Processors 110 and 130 may be embedded microprocessors, or microcontrollers, or state machines, may run management operating systems (OSs) for the connection, and/or may have built-in authentication/encryption engines. Processors 110 and 130, either alone or in combination with other elements presented herein, may be operative to manage the communications link, to monitor data passing through the units and over the communications link, and/or to provide application support for a host system, or to execute one or more state machines, or variations thereof as may become evident from the several functional descriptions set forth herein. In a broader sense, units 106 and 126 may be capable of performing one of more of (at least one of) the various functions described herein.

Memory 112 and 132 may be any suitable memory, such as random access memory (RAM), non-volatile RAM (NVRAM, such as flash memory), or the like, and may include registers containing configuration, status, permissions, content permissions, keys for authentication/encryption, application(s) (e.g., software and/or firmware for use by processor 110 and 130), and the like.

Control circuits 114 and 134 may include any suitable circuitry that may be capable of monitoring the state of the link and/or actively appending to or changing data concurrently ("on-the-fly") as it goes through unit 106 or 126, respectively.

Measurement circuits 116 and 136 may include any suitable circuitry that may be capable of observing (e.g., monitoring) the connection state/status, the connection type, and/or the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas 119 and 139) that may be suitable for converting between electrical signals (e.g., for the host system) and EM signals (e.g., for the contactless communications link). Transceivers 118 and 138 may each be a half-duplex transceiver that can asynchronously convert a baseband signal into a modulated EHF carrier, which may be radiated from an internal or external antenna (e.g., as shown schematically), or can receive and demodulate the carrier and reproduce the original baseband signal. The EHF carrier may penetrate a wide variety of commonly-used non-conductive materials (e.g., glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference (EMI) effects and/or to simplify FCC certification, if appropriate.

Transceivers 118 and 138 may be implemented as IC chips comprising a Tx, a Rx, and related components. Transceiver chip(s) may be packaged in a conventional manner, such as in ball grid array (BGA) format. The antenna may be integrated into the package, or may be external to the package, or may be incorporated onto the chip itself. An exemplary unit 106, 126 may include one, two, or more transceiver chips. Some features or characteristics of transceivers 118 and 138 may include low latency signal path, multi-gigabit data rates, link detection, and/or link training. The signals transmitted by transceivers 118 and 138 may be modulated in any suitable manner to convey the data being transferred from one device to the other device, some non-limiting examples of which are presented herein. Modulation may be OOK (on/off keying), ASK (amplitude shift keying), PSK (phase shift keying), QPSK (quadrature phase shift keying), QAM (quadrature amplitude modulation), or other suitable modulation techniques. Signals may be encoded and packetized and transmitted by one transceiver (e.g., transceiver 118), and received and unpacketized and decoded by another transceiver (e.g., transceiver 138). Out-of-band signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (e.g., fingerprinted), which may enable a later forensic analysis to be performed for digital rights management. For example, protected (e.g., premium) content could be freely (e.g., unimpededly) transferred from one device to another, but the transaction could be traced to the specific devices involved, so that the participants in the transaction can be held accountable (e.g., billed). Premium protected content may be modified, data appended thereto, and/or can be logged with chip ID, user ID, or by other means.

Communications link 150 may be a contactless link, and the first and second units 106 and 126 may be contactless connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Standards controllers, including Ethernet, may not be immediately apparent in that both may handle data flow between a host system and a communications link. However, a distinction between the contactless connectors disclosed herein and exemplary Standards controllers may be that the contactless connectors disclosed herein may both set up the contactless communications link and transfer data from a host system directly onto the contactless communications link, without the intermediary, for example, of mechanical connectors and/or a cable that utilize an electrical conduction medium rather than an RF medium. Further distinctions may be made in the way that the contactless connectors disclosed herein may be capable of operating independently and/or transparently from the host system, without requiring host awareness or interaction.

Data transfer between electronic devices 102 and 122 may be implemented over a contactless RF EM communications link 150, which may be handled substantially entirely by the units 106 and 126 of first and second devices 102 and 122, respectively. Signals flowing between units 106 and 126 of devices 102 and 122 may occur electromagnetically over a non-electrical (e.g., dielectric) medium, such as an air gap, waveguide, plastics (e.g., polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides. Alternatively, the signals may pass by way of a slot antenna in a conductive medium, where the slot antenna may direct the contactless connectivity in a desired direction. A device (e.g., at least the contactless connector) may be substantially fully enclosed by a conductive medium other than at a location where it may be desired to emit and/or receive EHF radiation from a partner device (e.g., at least the contactless connector thereof), which may also be similarly substantially fully enclosed by a conductive medium.

Due to the high data rate enabled by the EHF contactless communication unit, large data files, such as movies, audio, device images, operating systems, and the like may be transferred in very short periods of time in contrast with existing technologies such as NFC (near field communications). As an example, a 1 Gigabyte data file may be transferred in as little as 2 seconds. The electromagnetic communication may typically be over an air gap that may be limited to a short range, such as, for example, 0-5 cm. A dielectric medium, such as a dielectric coupler, may be used to extend the range of the contactless link between the devices 102 and 122 to several centimeters, meters, or more.

It should be understood that in this, and any other embodiments of contactless links discussed herein, an overall communications system may be implemented as a combination of contactless and physical links. Furthermore, some of the techniques described herein may be applied to transferring data over a physical link. In such a link, the transceiver can contactlessly transmit data to a cable that may serve as a physical conduit for the data.

One or both of devices 102 and 122 may have two or more transceivers. Having two or more transceivers may support a feedback loop, full duplex operation, and/or may simultaneously establish a second communications link (e.g., for communicating with the host system). An exemplary "data flow" may proceed as follows: data originating from host system 104 or data originating at unit 106 may be provided by unit 106, via its transceiver 118 and transducer 119, onto the communications link 150. The data may pass through or over communications link 150. Data received from the communications link 150 by transducer 139 and transceiver 138 of unit 126 may be provided to host system 124 or may remain with unit 126. Data may flow in the reverse direction, from host system 124 via unit 126 or originating at unit 126, onto the contactless link 150 to unit 106 which may pass the data to host system 104. Although not shown, each one of units 106 and 126 may include one or more suitable busses for communicating data and/or power between various components 108-119 and/or between various components 128-139.

Figure 2:
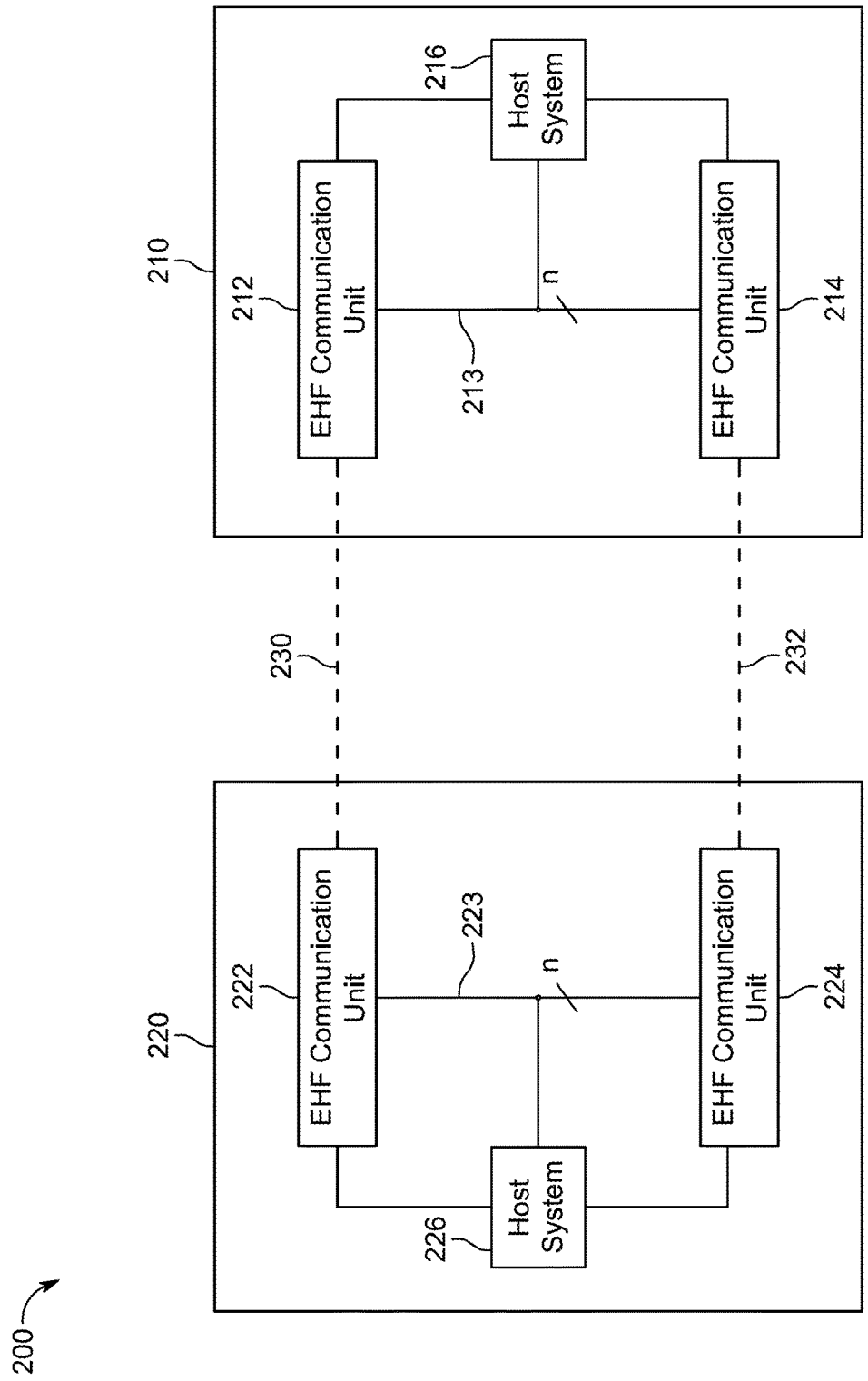
FIG. 2 illustrates a communications system having two electronic devices that communicate with one another over two or more contactless communications links, according to an embodiment.

FIG. 2 illustrates a communications system 200 wherein two electronic device subsystems or devices 210 and 220 may communicate with one another over two or more contactless communications links, according to an embodiment. System 200 may be similar to system 100 in many respects but, for illustrative and simplified discussion purposes, shows that each device may include two EHF communication units. Moreover, any EHF communication unit in system 200 may be the same or substantially the same as any EHF communication unit in system 100. As such, a more simplified representation of units 106 and 126 is shown in FIG. 2. If desired, each device can include several EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective subsystems or devices, and may thereby enable subsystems or devices 210 and 220 to operate for their intended functionality. In another embodiment, wired paths 213 and 223 may instead be EHF contactless communications links.

In some embodiments, each of EHF communication units 212, 214, 222, and 224 can be the same as EHF communication unit 106 or 126, discussed above. As such, EHF communication units 212, 214, 222, and 224 may include transceivers that may be capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 222 and 212, and a contactless communications link 232 may exist between EHF communication units 214 and 224. As shown, units 212 and 222 may work together as a coupled pair of units that may communicate via link 230, and units 214 and 224 may work together as another coupled pair of units that may communicate via link 232. If one or more additional coupled pairs of units were to be included in system 200, then additional communications links would also exist.

After the EHF contactless communication units progress through their respective state machines and establish the links, and data no longer needs to be communicated across the links, the units can enter in a power savings state or data transport idle state depending on whether they are being implemented as a Tx or Rx unit. The power savings state may enable an EHF communication unit to power down selective circuitry, after the EHF communication link has been established, when there may be no data to be communicated over the link. The Tx unit may transmit a "keep alive" signal to the Rx unit to prevent it from timing out and exiting out of its power savings state. The Rx unit may be periodically turned on to monitor whether the Tx is sending the "keep alive" signal. The Tx and Rx units may transition to a new state (e.g., a data transport state) when they receive instructions to do so. As a specific example, an apparatus can include an EHF transceiver and control circuitry. The control circuitry may be operative to control establishment of an EHF communications link with another apparatus by executing a state machine that may transition from state to state in response to satisfaction of any one of a plurality of conditions, establish the EHF communication link with the apparatus to selectively enable one of transmission and reception of data, after the EHF communication link with the apparatus may be established, monitor an absence of data being communicated over the EHF communication link, and enter into a power savings state in response to the monitored absence of data being communicated over the EHF communication link until the state machine transitions to a new state.

Both devices 210 and 220 have the ability to control activation and deactivation of the links existing between the two devices. For example, if the links are in a power savings mode, and device 210 decides it wishes to transmit data to device 220, device 210 may change a signal state on one of the pins of one of its EHF units to bring it out of sleep and into an active data transport ready state. In response to the change in signal state, it may transmit a signal over the contactless communications link to its counterpart EHF unit, which may exit out of its power state and enter into an active data transport state. In addition, the counterpart EHF unit may inform other circuitry within device 220 that incoming data traffic is about to commence and that any appropriate changes are put into effect so that the data can be handled properly. For example, in the context of various embodiments described herein, when the counterpart EHF unit is contained in an adapter device that is electrically coupled to a user device, the counterpart EHF unit may provide a signal that causes adapter circuitry to turn off an active connection coupling a memory to the user device and activate a connection coupling the memory to the EHF unit.

Figure 3:
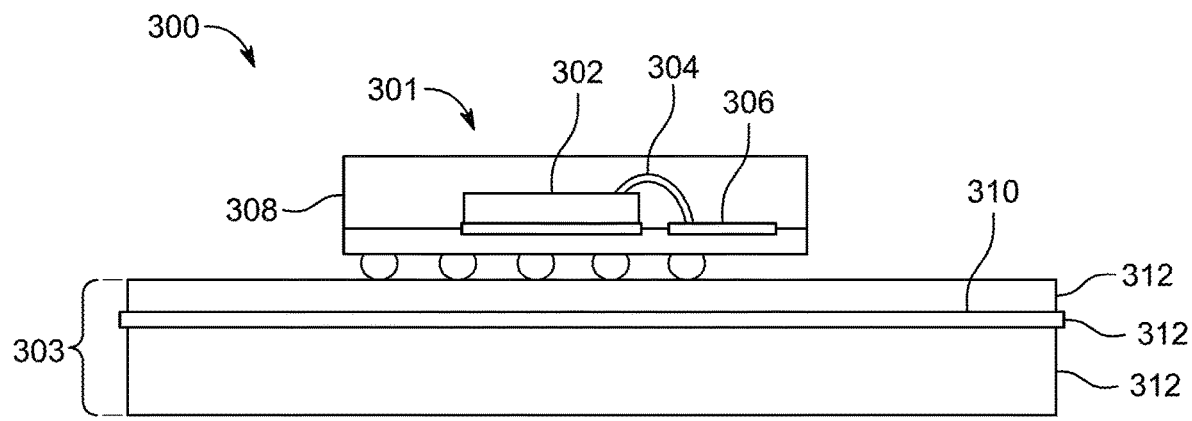
FIG. 3 is a side view of an exemplary EHF communication circuit showing a simplified view of some structural components.

FIG. 3 is a side view of an exemplary EHF communication circuit 300 showing a simplified view of some structural components. As illustrated, the communication circuit may include an integrated circuit package 301 that includes die 302 mounted on connector printed circuit board (PCB) 303, a lead frame (not shown), one or more conductive connectors such as bond wires 304, a transducer such as antenna 306, and an encapsulating material 308.

Die 302 may include any suitable structure configured as a miniaturized circuit on a suitable die substrate, and is functionally equivalent to a component such as a chip or an integrated circuit (IC). The die substrate may be formed using any suitable semiconductor material, such as, but not limited to, silicon. Die 302 may be mounted in electrical communication with the lead frame. The lead frame may be any suitable arrangement of electrically conductive leads configured to allow one or more other circuits to operatively connect with die 302. The leads of the lead frame may be embedded or fixed in a lead frame substrate. The lead frame substrate may be formed using any suitable insulating material configured to substantially hold the leads in a predetermined arrangement.

Further, the electrical communication between die 302 and leads of the lead frame may be accomplished by any suitable method using conductive connectors such as, one or more bond wires 304. Bond wires 304 may be used to electrically connect points on a circuit of die 302 with corresponding leads on the lead frame. In another embodiment, die 302 may be inverted and conductive connectors including bumps, or die solder balls rather than bond wires 304, which may be configured as a flip chip arrangement. Transducer 306 may be any suitable structure configured to convert between electrical and electromagnetic signals. In some embodiments, transducer 306 is an antenna. Transducer 306 in conjunction with the circuitry on die 302 may be configured to operate in an EHF spectrum, and may be configured to transmit and/or receive electromagnetic signals, in other words as a transmitter, a receiver, or a transceiver. In an embodiment, transducer 306 may be constructed as a part of the lead frame. IC package 301 may include more than one transducer 306. In another embodiment, transducer 306 may be separate from, but operatively connected to die 302 by any suitable method, and may be located adjacent to die 302. For example, transducer 306 may be connected to die 302 using bond wires. Alternatively, in a flip chip configuration, transducer 306 may be connected to die 302 without the use of the bond wires. In other embodiments, transducer 306 may be disposed on die 302 or on PCB 303.

Encapsulating material 308 may hold the various components of IC package 301 in fixed relative positions. Encapsulating material 308 may be any suitable material configured to provide electrical insulation and physical protection for the electrical and electronic components of the IC package. For example, encapsulating material 308 may be a mold compound, glass, plastic, or ceramic. Encapsulating material 308 may be formed in any suitable shape. For example, encapsulating material 308 may be in the form of a rectangular block, encapsulating all components of the IC package except the unconnected leads of the lead frame. One or more external connections may be formed with other circuits or components. For example, external connections may include ball pads and/or external solder balls for connection to a printed circuit board.

IC package 301 may be mounted on a connector PCB 303. Connector PCB 303 may include one or more laminated layers 312, one of which may be a PCB ground plane 310. PCB ground plane 310 may be any suitable structure configured to provide an electrical ground to circuits and components on the IC package. With the placement of the ground layer, at an appropriate distance from the antenna, the electromagnetic radiation pattern may be directed outwards from the substrate.

Figure 4:
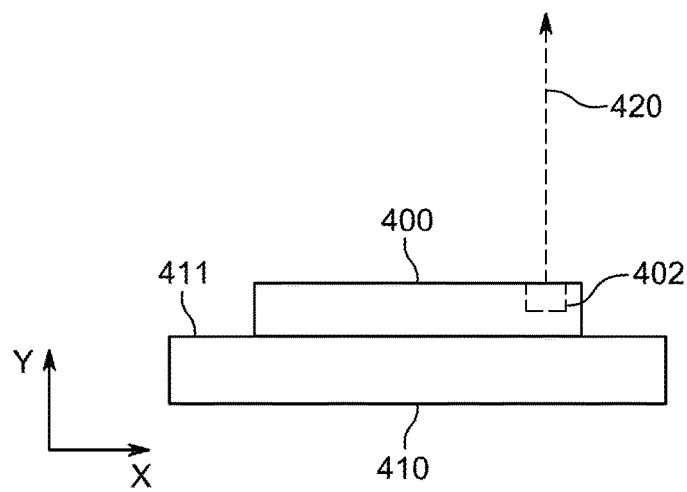
FIG. 4 shows a simplified and illustrative EHF CCU mounted to a substrate, according to an embodiment.
Figure 5:
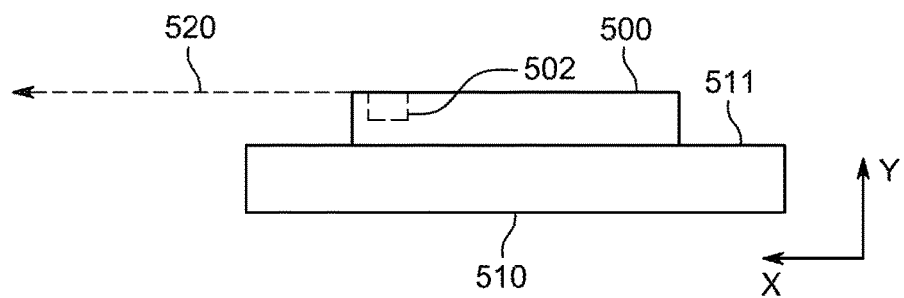
FIG. 5 shows another simplified and illustrative EHF CCU mounted to a substrate, according to an embodiment.

FIG. 4 shows a simplified and illustrative EHF CCU 400 mounted to substrate 410, according to an embodiment. CCU 440 may include transducer 402 that is designed to transmit contactless EHF signals in the direction of signal path 420. Path 420 projects in a direction perpendicular to surface 411 of substrate 410. In other words, path 420 projects in the Y-axis direction. The direction of signal path 420 is merely illustrative. For example, the signal path can be directed in any suitable direction. For example, FIG. 5 shows a simplified and illustrative EHF CCU 500 mounted to substrate 510. CCU 500 may include transducer 502 that is designed to transmit contactless EHF signals in the direction of signal path 520. Path 520 projects in a direction co-planar to surface 511 of substrate 510. In other words, path 520 projects in the X-axis direction.

Thus, although it may be desirable for EHF signals to be transmitted along a desired signal path (e.g., such a path 420 or 520), non-directed, free flowing EHF signal energy may emit in all directions, thereby resulting in radiation patterns that are not confined to the desired signal path. Non-directed transmission of EHF signals in undesired directions may cause cross-talk. Such cross-talk may exist over-the-air, within circuit boards, and/or within device housings. In addition, non-directed transmission of EHF signals may also result in reduced signal strength, thereby potentially making it more difficult for receiving CCUs to capture the EHF signals.

Figure 6:
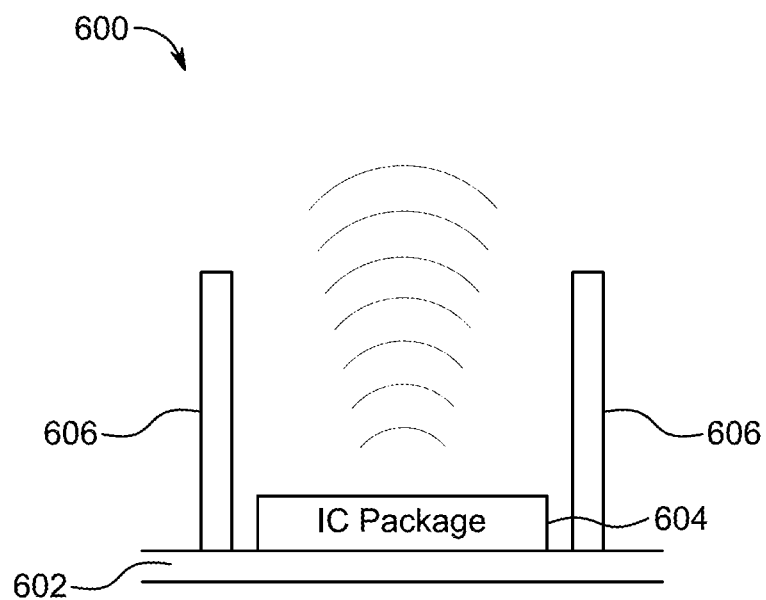
FIG. 6 illustrates one IC package mounted to a printed circuit board, according to an embodiment.

FIG. 6 illustrates one IC package 604 mounted to the PCB 602. However, in other implementations, more than one IC package can be mounted to the same PCB 602. The communication module 600 can be part of a communication system of a device, e.g., a computer, mobile phone, tablet, kiosk, or other device/system. Signal guiding structure 606 extends upward from PCB 602. The communication system can be configured to provide wireless communication using one or more IC packages. For example, the communication system can include two IC packages, one configured as a transmitter and the other configured as a receiver. The communication system can be in communication with a storage device. Thus, for example, the communication system can transfer data between the data storage unit and an external device using wireless communication provided by the IC packages.

Figure 7:
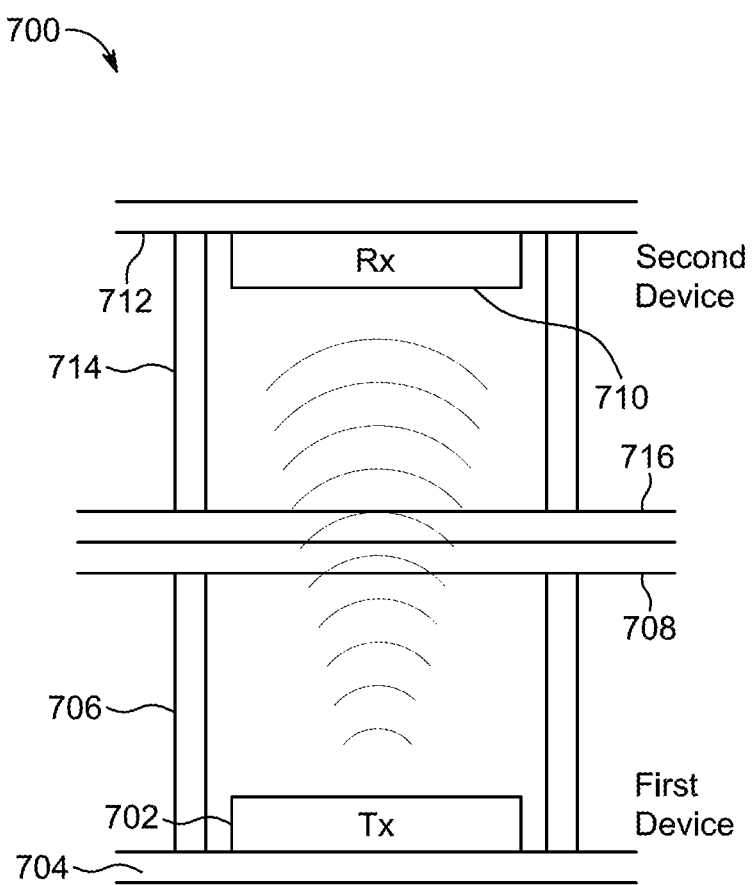
FIG. 7 is a side view diagram illustrating an example of communication between a transmitter and a receiver, according to an embodiment.

FIG. 7 is a side view diagram 700 illustrating an example of communication between a transmitter and a receiver. For example, a first device may exchange data with a second device. The two devices can be positioned in proximity to each other such that the respective communication modules for transmitting and receiving data are aligned and in range of each other. In particular, for EHF frequencies, the devices may be very close to each other to optimize transmissions. For example, the external housing of the devices may need to be in physical contact to facilitate data communication.

In FIG. 7, a first device includes a first communication module having a transmitter IC package 702 positioned on a first PCB 704. The transmitter IC package 702 is surrounded by a first signal guiding structure 706 forming a channel. The first signal guiding structure 706 extends to a surface of a first housing 708 of the first device. For example, the first device can be a first mobile phone and the first housing 708 can correspond to the outer case of the first mobile phone.

A second device includes a second communication module having a receiver IC package 710 positioned on a second PCB 712. The receiver IC package 710 is surrounded by a second signal guiding structure 714 forming a channel. The second signal guiding structure 714 extends to a surface of a second housing 716 of the second device. For example, the second device can be a second mobile phone and the second housing 716 can correspond to the outer case of the second mobile phone.

As illustrated by diagram 700, the first signal guiding structure 706 and the second signal guiding structure 714 are aligned and an outer surface of the first housing 708 and the second housing 716 are in physical contact to provide minimal communication distance and interference. A data transmission from the transmitter IC package 702 passes along the first signal guiding structure 706 and the second signal guiding structure 714 to the receiving IC package 710.

Figure 8:
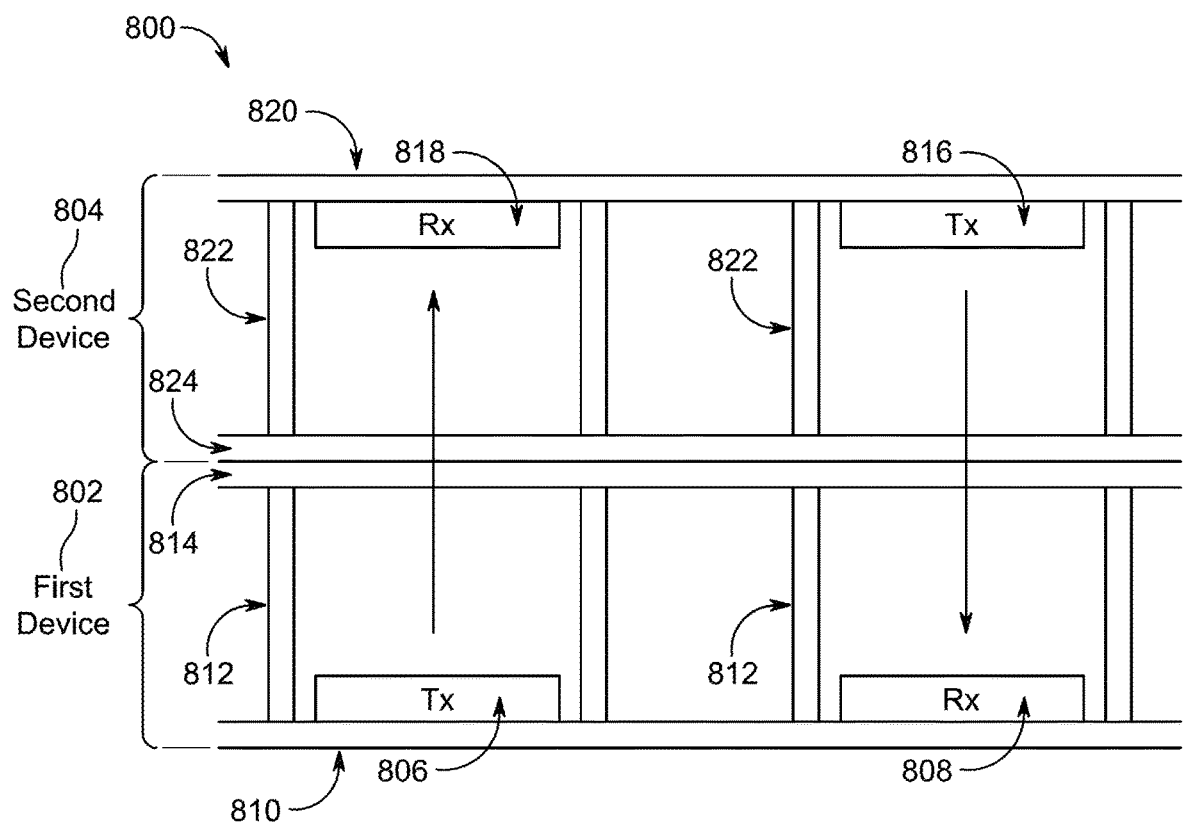
FIG. 8 shows a side view diagram illustrating an example of communication between a pair of transmitters and receivers, according to an embodiment.

FIG. 8 shows a side view diagram 800 illustrating an example of communication between a pair of transmitters and receivers. Diagram 800 includes a portion of a first device 802 and a second device 804. The first device 802 includes a first transmitter IC package 806 and a first receiver IC package 808 mounted to a first PCB 810. Each of the first transmitter IC package 806 and the first receiver IC package 808 is encircled by a respective first signal guiding structure 812. The first signal guiding structure 812 forms a channel extending to a surface of a first housing 814 of the first device 802. For example, the first device 802 can be a first mobile phone and the first housing 814 can correspond to the outer case of the first mobile phone. The second device 804 includes a second transmitter IC package 816 and a second receiver IC package 818 mounted to a second PCB 820. Each of the second transmitter IC package 816 and the second receiver IC package 818 is encircled by a respective second signal guiding structure 822. The second signal guiding structure 822 provides a channel extending to a surface of a second housing 824 of the second device 802. For example, the second device 802 can be a second mobile phone and the second housing 824 can correspond to the outer case of the second mobile phone. As shown in FIG. 8, the first signal guiding structures 812 and the second signal guiding structures 822 are substantially aligned on either side of the respective first and second housings 814, 824. The alignment minimizes data transmission loss from the first transmitter IC package 806 to the second receiver IC package 818 and from the second transmitter IC package 816 to the first receiver IC package 808.

Figure 9:
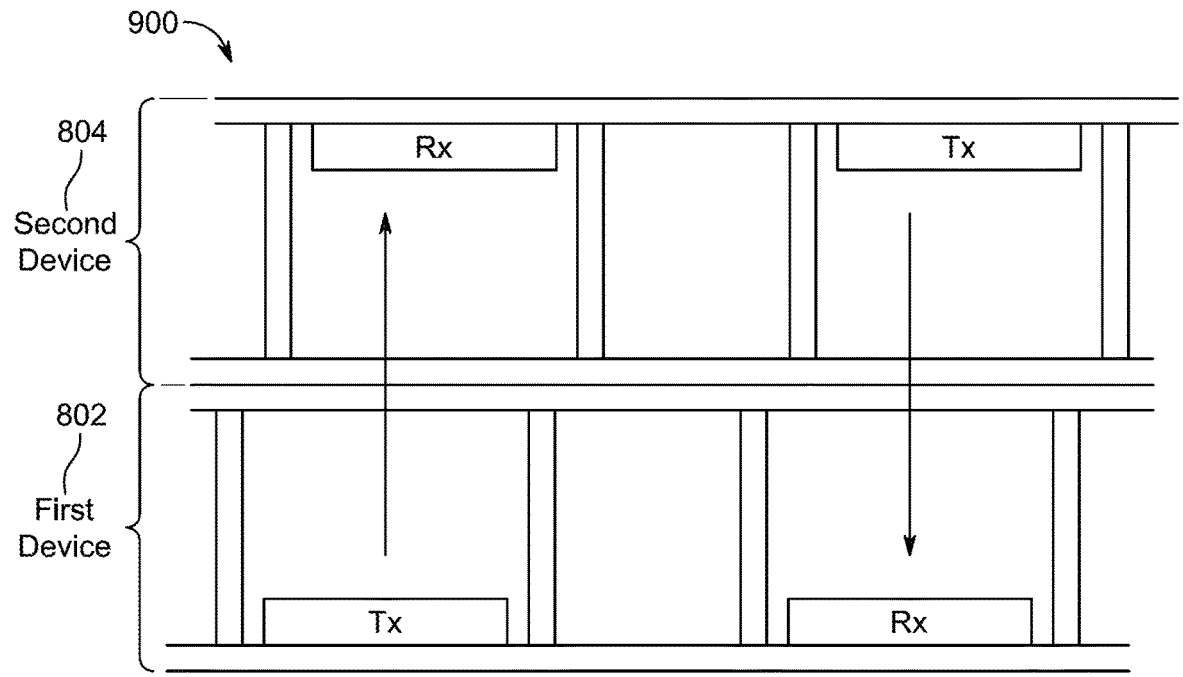
FIG. 9 shows a side view diagram illustrating an example of a misaligned pair of transmitters and receivers, according to an embodiment.

By contrast, FIG. 9 shows a side view diagram 900 illustrating an example of a misaligned pair of transmitters and receivers. In particular, diagram 900 illustrates the portion of the first device 802 and the second device 804 of FIG. 8 where the respective signal guiding structures are not aligned with one another. For example, the first device 802 and second device 804 may both be mobile devices. When placed next to each other to communicate data, the devices may not be aligned perfectly, which may mean that the signal guiding structures are not aligned with one another within a specified tolerance.

For example, the transmitter and receiver IC packages of each device can operate in the EHF band and require a high degree of alignment to prevent signal degradation or loss. In some implementations, the signal guiding structures are preferably aligned within 0.5 mm. Thus, even a small amount of misalignment can result in signal loss between respective transmitters and receivers of the devices. Additionally, in the example shown in FIGS. 8-9, a particular orientation of the first and second devices may be needed to align a respective transmitter with a respective receiver.

This specification describes connector structures that provide alignment of CCUs and electrical connections for enabling transfer of power between devices. In some implementations, the connectors are configured to provide alignment in x, y, and z directions, relative to each other, and to provide removable retention among coupled connectors. The connectors are robust, easy to use, and can ensure contactless communications can be established and sustained between any two structures coupled together via the connectors. In addition, the connectors are compact structures that integrate power and alignment in a manner that minimizes the footprint required to incorporate the connector in a structure or device.

Figure 10A:
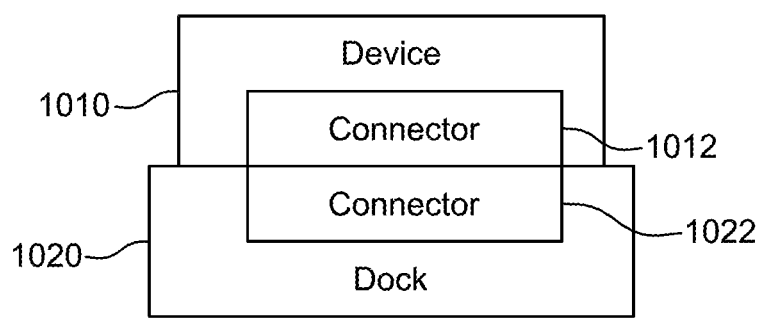
FIGS. 10A-10C show different illustrative connector embodiments, according to various embodiments.
Figure 10B:
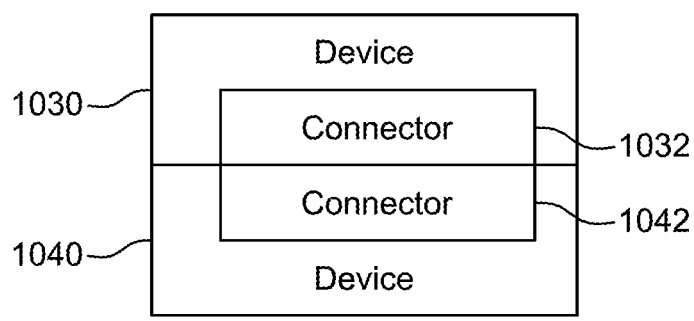
Figure 10C:
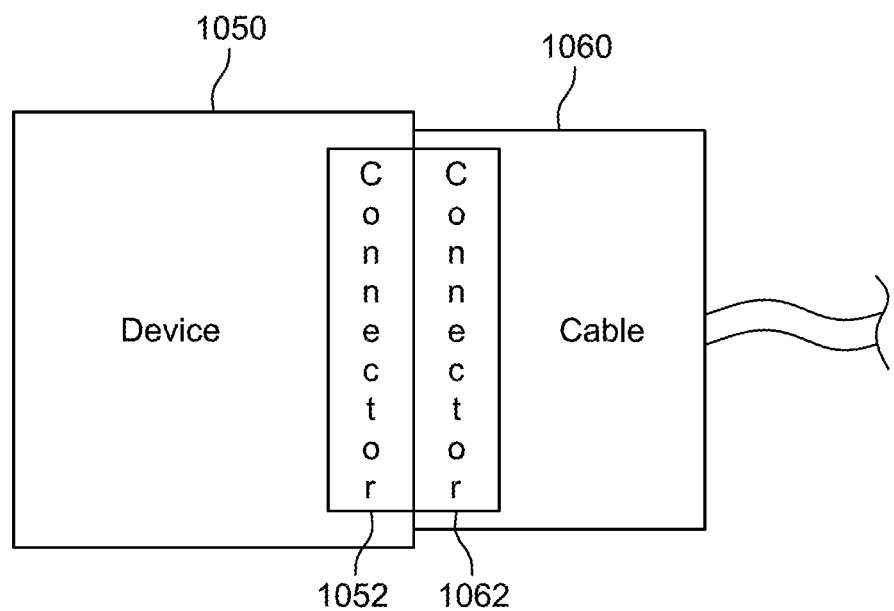

FIGS. 10A-10C show different illustrative connection embodiments. Each of FIGS. 10A-10C shows a device interfacing with another structure via a connector according to embodiments discussed herein. For example, FIG. 10A shows device 1010 connected to dock 1020 via connectors 1012 and 1022. FIG. 10B shows device 1030 connected to device 1040 via connectors 1032 and 1042. FIG. 10C shows device 1050 connected to cable 1060 via connectors 1052 and 1062.

Figure 11:
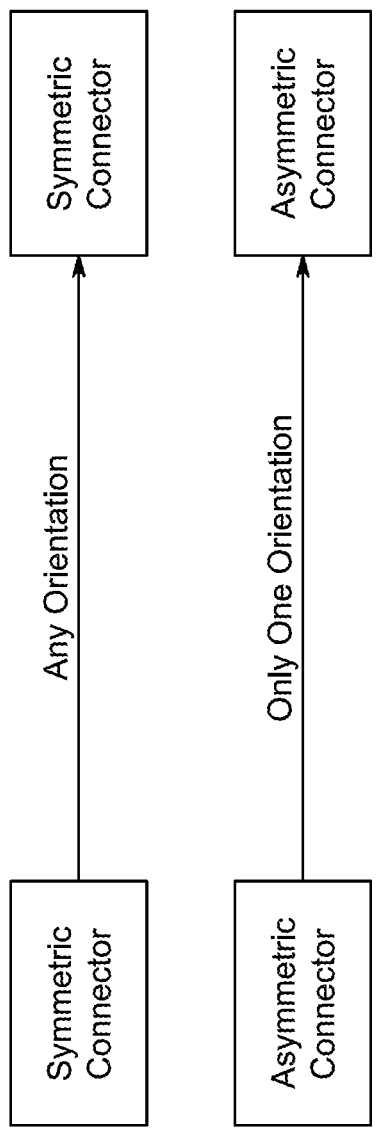
FIG. 11 shows that the connectors can be symmetric or asymmetric, according to various embodiments.

FIG. 11 shows that the connectors according to embodiments discussed herein can be symmetric or asymmetric. Symmetric connectors can offer the advantage that enables a user to connect his device to another structure without regard to a particular orientation. This can simplify the user experience, but may require additional design considerations to ensure CCUs are properly aligned regardless of the connection orientation. In addition, in symmetric connectors, circuitry, software, or a state machine may be used to determine how to use the CCUs. For example, if each connector has two CCUs, a determination is made as to which CCU serves as the transmitter and which serves as the receiver. Asymmetric connectors, in contrast, may require a particular orientation of the connectors in order to connect a device to another structure. The fixed orientation, however, may simplify alignment design constraints for the CCUs.

Figure 12:
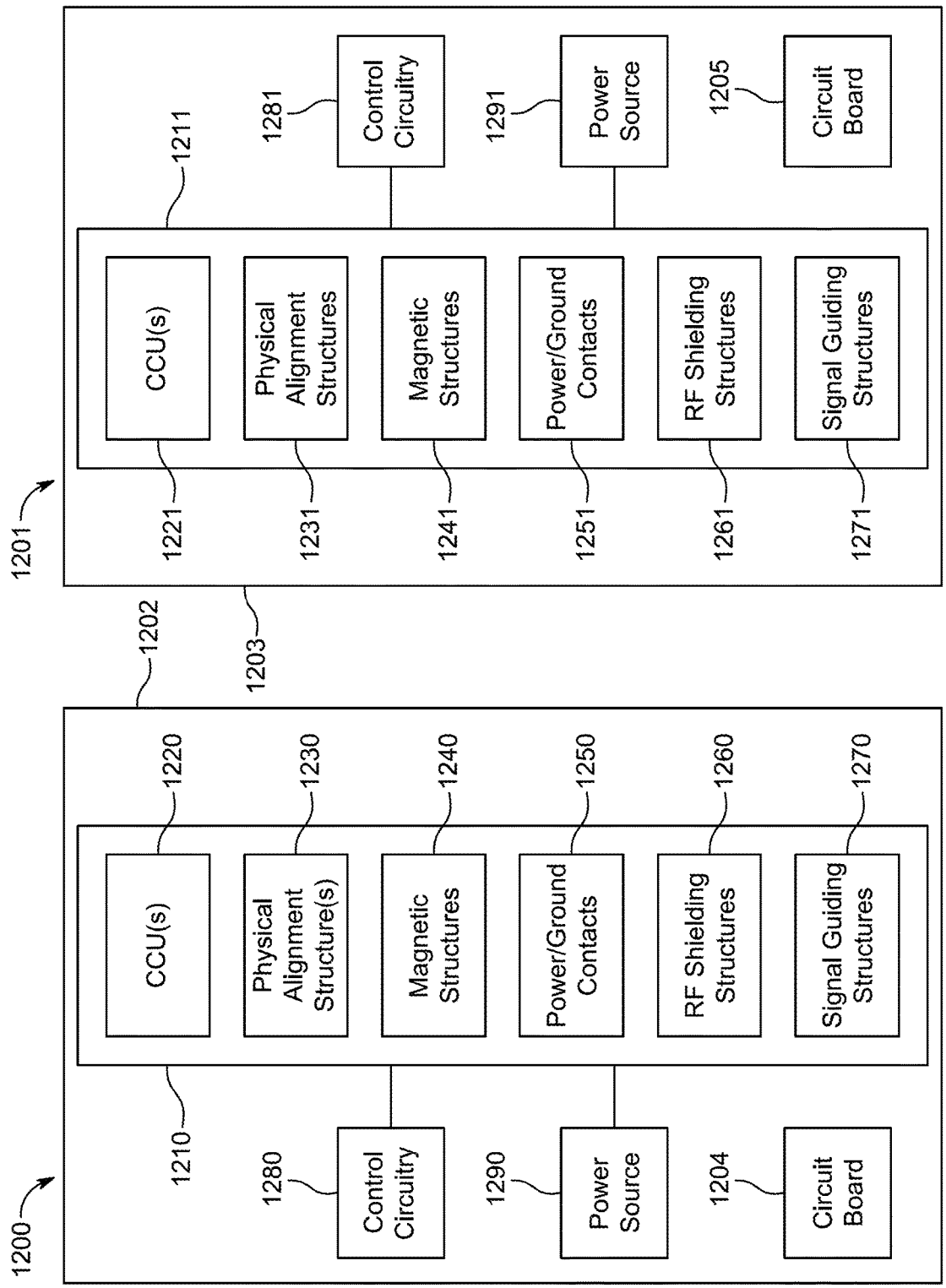
FIG. 12 shows an illustrative block diagram of structures that can be coupled together via a connector, according to an embodiment.

FIG. 12 shows an illustrative block diagram of structure 1200 having connector 1210 that can be coupled to connector 1211 of structure 1201 according to an embodiment. Connector 1210 is designed to interface with a reciprocal connector 1211 of structure 1201. Connector 1210 can include one or more CCUs 1220, one or more physical alignment structures 1230, one or more magnetic structures 1240, power/ground contacts 1250, one or more RF shielding structures 1260, and one or more signal guiding structures 1270. Structure 1200 may also include control circuitry 1280 and power source 1290. Structures 1200 and 1201 may include other components but such components are omitted to avoid overcrowding the drawing. Structures 1200 and 1201 may be a device (e.g., a phone, tablet, computer), a dock, a cable, or other suitable structure including CCUs. Connector 1211 can include one or more CCUs 1221, one or more physical alignment structures 1231, one or more magnetic structures 1241, power/ground contacts 1251, one or more RF shielding structures 1261, and one or more signal guiding structures 1271. Structure 1201 may also include control circuitry 1281 and power source 1291.

Structure 1200 may have housing 1202 and circuit board(s) 1204 and structure 1201 may have housing 1203 and circuit board(s) 1205. Housings 1202 and 1204 may represent the outer shell of structures 1200 and 1201, respectively. For example, housings 1202 and 1204 can include any combination of a metal or plastic shell, glass, and a bezel. In some embodiments, portions of connector 1210 can form part of housing 1202, and portions of connector 1211 can form part of housing 1203. That is, certain portions of the connectors may be integrally formed within the housings, are part of the housings, or are secured to the housing. For example, one or more of physical alignment structures 1230, magnetic structures 1240, power/ground contacts 1250 may be integrated, part of, or secured to housing 1202.

Circuit boards 1204 and 1205 may serve as mounting platforms for portions of connectors 1210 and 1211. For example, circuit board 1204 can be positioned relative to a main body of connector 1210 and can contain CCUs 1220 and signal guiding structures 1270. CCUs 1220 can be mounted on the side of circuit board 1204 that is facing connector 1210, and a signal guiding structure 1270 can be positioned over each CCU so that it spans a distance between circuit board 1204 and connector 1210, thereby providing an EHF pathway between the CCU and housing 1202. A specific example of this configuration is shown in FIG. 19C.

CCUs 1220 have been discussed above. Connector 1210 may include any number of CCUs depending on which communications protocols (e.g., USB, DisplayPort, etc.) are supported by the connector. CCUs 1220 can communicate with counterpart CCUs 1221 in connector 1211. In one embodiment, connector 1210 may include two CCUs, similar to that shown in either device 210 or 220 of FIG. 2, where one CCU serves as a transmitter and the other CCU serves as a receiver. In another embodiment, connector 1210 may include only one CCU, which alternates roles between transmitter and receiver to conduct contactless data communications. In yet another embodiment, connector 1210 may include five CCUs to support, for example, DisplayPort.

Physical alignment structure 1230 represents one or more physical structures that are designed to mate with one or more reciprocal physical structures of device 1201, and in particular with reciprocal physical structures 1231 of connector 1211. Physical alignment structures 1230 and 1231 may be arranged such that when connectors 1210 and 1211 are interfaced together, CCUs 1220 and 1221 are optimally aligned with each other to efficiently conduct contactless communications. Power and ground contacts 1250 may be electrically and physically coupled to power and ground contacts 1251 when connectors 1210 and 1211 are interfaced together. In addition, magnetic structures 1240 and 1241 may also be aligned when connectors 1210 and 1211 are interfaced together. Further still, RF shielding structures 1260 and 1261 may also be aligned when connectors 1210 and 1211 are interfaced together.

The user experience in mating connectors 1210 and 1211 may be intuitive based on the design and configuration of physical alignment structures 1230 and 1231 and/or other components within the connector (e.g., magnetic structure 1240, power/ground contacts 1250, RF shielding structures 1260). For example, physical alignment structures 1230 and 1231 may have a keying structure that dictates how connectors 1210 and 1211 should mate. As another example, one of the connectors may be male and the other may be female.

Magnetic structures 1240 may be used to perform any one of several different tasks. For example, in one embodiment, magnet structures 1240 and 1241 may assist alignment structures 1230 in interfacing connectors 1210 and 1211. In another embodiment, magnetic structures 1240 and 1241 may provide a retention force to hold connectors 1210 and 1211 together. In yet another embodiment, magnetic structures 1240 and 1241 may also be used to convey signals from one device to another. For example, magnets may be used to indicate that an interface connection has been made between connectors 1210 and 1211.

Power and ground contacts 1250 and 1251 may be used to convey power via power and ground contacts. These contacts are based on physical interaction that enables electrical signals to pass. The physical contacts can take any suitable configuration, including, for example, interference fits, spring loaded contacts, pogo-pins, contact-to-contact patch connections, and the like. In addition to providing power, power and ground contacts 1250 and 1251 may be used to provide "connection made" signals to their respective control circuitries when connectors 1210 and 1211 are connected together.

RF shielding structure 1260 may represent structural configuration and material compositions that enable connector 1210 to exhibit an EHF shield when it is connected to connector 1211. The EHF shield is designed to minimize or completely eliminate EHF leakage that may emanate from CCUs during contactless data transfer. RF shielding structure 1260 and 1261 can be constructed from a combination of different materials and components to minimize or completely eliminate EHF leakage. These materials can include transmissive materials that are operable to facilitate propagation of EHF signals, reflective materials that are operable to reflect EHF signals, and absorptive materials are operable to absorb EHF signals. Examples of transmissive materials can include plastics and other materials that are electrically non-conductive (i.e., dielectric). Reflective materials can include, for example, metals, metal alloys, and other materials that are electrically conductive. Examples of absorptive materials can include, for example, carbon loaded (or magnetically loaded), rubber materials that are electrically non-conductive, but exhibit effective EHF dampening resonance due to their high permittivity and permeability. A specific example of an absorptive material is sold as Eccosorb, by Emerson & Cunning Microwave Products of Randolph, Mass.

In some embodiments, RF shielding structure 1260 can be constructed from just one of the different material types. For example, shielding structure 1260 can be constructed from just the conductive material or just the reflective material. In other embodiments, shielding structure 1260 can be constructed from two or more of the different material types. For example, shielding structure 1260 can be constructed from transmissive and reflective materials, from transmissive and absorptive materials, or from reflective and absorptive materials. As yet another example, shielding structure 1260 can be constructed from transmissive, reflective, and absorptive materials.

In some embodiments, shielding structure 1260 can be constructed from an open celled material. The open cell construction may be such that the any gaps that serve as a transmission path is a fraction of the wavelength of any EHF signal attempting to pass through. If desired, the open celled material may be constructed from an absorptive material to further enhance its EHF signal blocking capacity. In some embodiments, the open celled material may be air permeable but impenetrable to EHF signals. Thus, its usage in structures containing electronics requiring air-based cooling may be particularly advantageous. In some embodiments, the open celled material may be a foam that can be applied in various locations within an enclosure or connector as a liquid/gas mixture that can occupy "hard-to-reach" spaces, thereby enabling EHF signal containment.

For any coupled pair of connectors, the selection of material types for a first connector may be the same as for a second connector. Alternatively, the material selection for both connectors need not be identical in order to ensure an EHF leakproof shield exists between the two connectors. For example, for another coupled pair of connector, the selection of material types for a first connector assembly may be different than a selection of a material type for a second connector assembly. Thus, despite the use of different materials, a substantially shielded connection may exist between the two connectors. In some embodiments, the materials selected for both connector assemblies may be such that they complement each other when the two connector assemblies are mated together.

Signal guiding structures 1270 may be operative to guide EM signals through pathways from the CCU to the outside of the device and thereby can minimize or eliminate cross-talk among adjacent paths within a device and across devices. The signal guiding structures can be constructed from a combination of different materials to shape the direction of signal propagation and to mitigate EHF leakage (which may cause cross-talk). These materials can include EHF transmissive materials that are operable to facilitate propagation of EHF signals, EHF reflective materials that are operable to reflect EHF signals, and EHF absorptive materials that are operable to absorb EHF signals. Examples of transmissive materials can include plastics and other materials that are electrically non-conductive (i.e., dielectric). Reflective materials can include, for example, metals, metal alloys, metal foam, and other materials that are electrically conductive. Absorptive materials may have a conductive component, or more exactly, have a loss mechanism that is modeled by a conductive or resistive component. They are often not very conductive for static fields, but can exhibit high dissipative loss at RF frequencies. For example some classes of magnetically loaded materials exhibit loss due to hysteresis losses in ferromagnetic materials. EHF dampening is not due to the permittivity and permeability, but due to other dissipative properties of the materials.

In some embodiments, the signal guiding structures can be constructed from just one of the different material types. For example, the signal guiding structures can be constructed from just the EHF transmissive material or just the EHF reflective material. In other embodiments, the structure can be constructed from two or more of the different material types. For example, one portion can be constructed from transmissive materials, and another portion can be constructed from reflective materials.

Signal guiding structures 1270 may be constructed to exhibit any suitable shape, and can be constructed from a single component or multiple components. Regardless of shape and construction configuration, each conduit may include at least one signal focusing structure that has a channel existing within the focusing structure. Any suitable shape, including for example, rectangular, elliptical, or polygonal shapes of any suitable dimension may characterize each channel. The focusing structure may be constructed from, lined with, or coated with an EHF reflective material that may simultaneously guide EHF signals along the channel and prevent those same signals from penetrating the channel wall.

In addition to providing one or more pathways for channeling EHF signals, the conduit structures may protect the EHF CCUs from shock events. That is, during an event that imparts shock energy to the device, such as a device drop, the conduit structure can absorb the shock to prevent potentially damaging energy transfer to the EHF CCUs. In one embodiment, the shock protection can be achieved by constructing at least a portion of the conduit structure from a relatively rigid material (e.g., plastic) that covers the EHF CCU(s). In another embodiment, shock protection can be achieved using a relatively compliant material (e.g., foam) that also covers the EHF CCU(s). In yet another embodiment, a combination of relatively rigid and compliant materials may be used to provide protection.

The signal guiding structures may also be constructed to account for tolerance variations in device stackup. That is, variations in component construction can vary the stackup tolerances when assembled. For example, the distance between the EHF units and the interface may vary depending on construction and variations in components. In one build, the distance may be x and in another build, the distance may be y, where x and y are different. The conduit structure may include a compliant material that is designed to accommodate variations in stackup. The compliant material may be compressible and thus able to ensure that the conduit structure makes a secure and flush connection with the interface.

Control circuitry 1280 and 1281 may perform various operations relating to connections between devices 1200 and 1210, including detection of the connection, verification of the connection, and termination of the connection. Control circuitry 1280 and 1281 may perform one or more checks to authorize communication between devices 1200 and 1201.

Further, control circuitry 1280 may determine whether device 1201 is an acceptable device when connected to device 1200. Control circuitry 1280 may analyze the one or more signals received from second device 1201, such as from the CCU 1221. Control circuitry 1281 may analyze and/or process the electromagnetic signals received from device 1200 or more specifically from CCU 1220.

In some embodiments, the user may move a position of at least one of devices 1280 and 1281 relative to each other when the generated electrical EHF signal indicates that the connectors 1210 and 1211 are not in alignment (See FIG. 9). When connectors 1210 and 1211 are not in alignment, control circuitry 1280 may prevent CCUs 1220 from operating and supplying power from power source 1290 to device 1201 via power/ground contacts 1250. Further, devices 1280 and 1281 may be moved until the received electromagnetic EHF signal indicates that connectors 1210 and 1211 are in alignment (See FIG. 8). When connectors 1210 and 1211 are in alignment, control circuitry 1280 may enable CCUs 1220 to operate and enable supply of power from power source 1290 to device 1201 via power/ground contacts 1250. In addition, when connectors 1210 and 1211 are in alignment, the EHF shield formed among RF shielding structures 1260 and 1261 may be established to prevent undesired EHF signal leakage.

Figure 13:
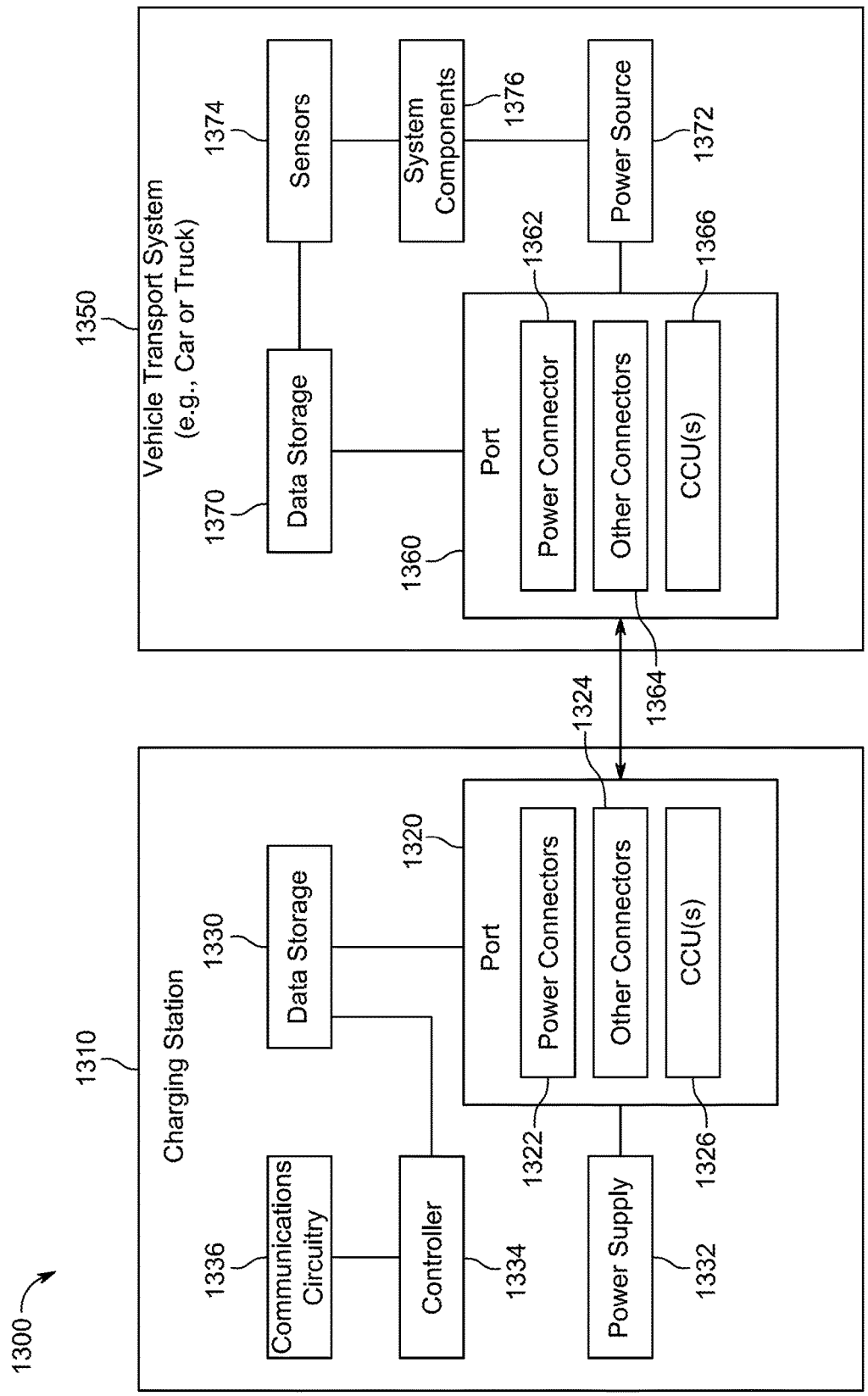
FIG. 13 shows an illustrative system that can include a charging station and a vehicle transport system, according to an embodiment.

FIG. 13 shows illustrative system 1300 that can include charging station 1310 and vehicle transport system 1350 according to an embodiment. Charging station 1310 can include port 1320 that is designed to couple to port 1360 of vehicle system 1350. Port 1320 may include power connectors 1322, other connectors 1324, and CCUs 1326. Port 1320 may embody one of the known standards for transferring charge from an EVSE to a vehicle such as, for example, one-phase AC connectors such as a SAE J1772, three-phase AC connectors such as a Mennekes type 2, combined charging connectors (that include both AC and DC pins), DC only connectors such as Tesla's proprietary connector and the CHAdeMO connector. Charging station 1310 can also include data storage 1330, power supply 1332, controller 1334, and communications circuitry 1336. Power supply 1332 may provide the AC, DC, or both AC and DC power required by vehicle system 1350. Data storage 1330 may be any suitable storage mechanism for storing large amounts of data such as a hard-drive or a solid state drive, or cloud storage. Controller 1334 may be operative to control the flow of data from port 1320 to data storage 1330 to communications circuitry 1336. Communications circuitry 1336 may include any two-way wired or wireless communications for transmitting data between data storage 1330 and a remote server (not shown).

Vehicle transport system 1350 can include port 1360, which may include power connectors 1362, other connectors 1364, and CCUs 1366, data storage 1370, power source 1372, sensors 1374, and system components 1376. Port 1360 may be the reciprocal version of port 1320 and is designed to interface therewith. Data storage 1370 may be any suitable storage mechanism that can store, for example, data collected by sensors 1374. Sensors 1374 can include, for example, a global positioning system, an inertial measurement system, a radar unit, a laser rangefinder/LIDAR unit, and a camera. System components 1376 can include propulsion system elements such as, for example, motor/engine, transmission, and wheels/tires, control system elements such as, for example, a steering unit, throttle, brake unit, sensor fusion algorithms, computer vision systems, navigation system, and an obstacle avoidance system, and peripherals such as, for example, a wireless communications system, a touch screen, a microphone, and a speaker. System components 1376 can also include a computer system, which can include one or more processors and instructions.

Ports 1320 and 1360 can include mating sets of electromechanical contacts that provide a physical connection at the vehicle interface for the power conductors, an equipment grounding conductor, a control pilot conductor, and a proximity sense conductor to provide a signal that helps reduce electrical arcing of the coupler during disconnect. Thus, the interface typically has at least five contacts that perform the interface functions. In addition, the coupler can include a latching mechanism to prevent inadvertent or accidental decoupling. The latching mechanism may also serve to properly align the connector with the vehicle inlet by requiring a latch element projecting from the connector to be registered with a cooperating latch element in the vehicle inlet.

Ports 1320 and 1360 may be specific implementations of structures 1200 and 1201, as discussed above. That is, ports 1320 and 1360 may include physical alignment structures that force ports 1320 and 1360 to interface with each other in a particular orientation. When ports 1320 and 1360 are interfacing, their respective power connectors 1322/1362 and other connectors 1324/1364 may be physically coupled to each other. In addition, CCUs 1326 and 1366 may be aligned so that contactless communications can be conducted between charging station 1310 and vehicle system 1350. CCUs 1326 and 1366 can be integrated within their respective ports without affecting the male/female interfacing characteristics or dimensions necessary for adhering to the coupling standards commonly used in connection with EVSEs and plug-in electric vehicle. Thus, by taking advantage of known interfacing characteristics of EVSE and plug-in electric vehicle couplings, CCUs can be integrated therein in a way that ensures that contactless communications can be routinely and consistently made each and every time ports 1320 and 1360 are connected. Moreover, by using CCUs in lieu of conventional mechanical data connectors, the service life of the data connection formed via the CCUs will far outlast that of a data connection formed by any conventional mechanical data connector. This is because the mechanical connectors will be subject to excessive wear and tear, especially in the charging scenario where there may be many public users, some of which may not exercise the utmost care when connecting and disconnecting the charger to their vehicle. The CCUs do not require a physical connection to transfer data, but rather require alignment between counterpart pairs of CCUs to enable data transfer.

Although vehicle transport system 1350 is described in the context of an automobile or truck, system may also be implemented in or take the form of other vehicles, such as cars, trucks, motorcycles, buses, boats, airplanes, helicopters, lawn mowers, earth movers, boats, snowmobiles, aircraft, drones, spacecraft, recreational vehicles, amusement park vehicles, farm equipment, construction equipment, trams, golf carts, trains, and trolleys. Other vehicles are possible as well.

Figure 14:
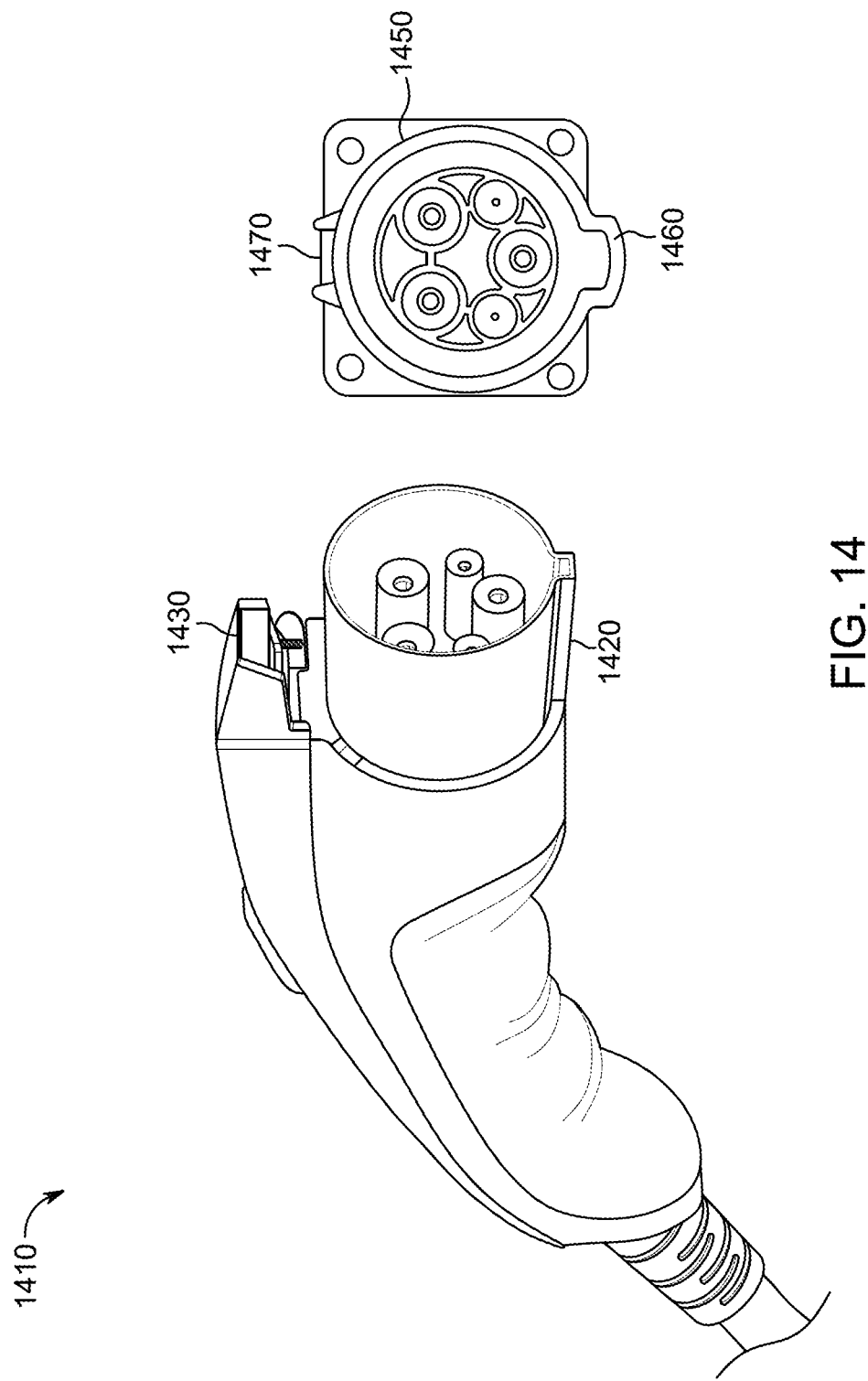
FIG. 14 shows illustrative male and female connector assemblies that adhere to the J1772 standard, according to an embodiment.

FIG. 14 shows illustrative male and female connector assemblies that adhere to the J1772 standard, according to an embodiment. Male connector assembly 1410 may be associated with a charging station and female connector assembly 1450 may be associated with a vehicle. As shown, both connector assemblies include connectors that mate with each other when both assemblies are coupled together. In addition, both connector assemblies can include a keying arrangement that forces the connector assemblies to be oriented in a particular direction when coupled together. For example, assembly 1410 can include rectangular member 1420 that is designed to slide in channel 1460 of assembly 1450. Male connector assembly 1410 may have a releasable latch 1430 that can be connected to and disconnected from latch retention member 1470. Use of latch 1430 may ensure that assembly 1410 is properly seated in assembly 1450 to ensure that the connectors are safely secured to each other. Because connector assemblies 1410 and 1450 are coupled together in the same manner each and every time they are connected, CCUs can be integrated within both connector assemblies in a way the ensure that contactless connections are made between counterpart pairs of the CCUs each time the assemblies are coupled together. These CCUS can be used to provide a high speed/high bandwidth data link between both connector assemblies. Different embodiments of CCU placement are discussed below in connection with FIGS. 15 and 16.

Figure 15:
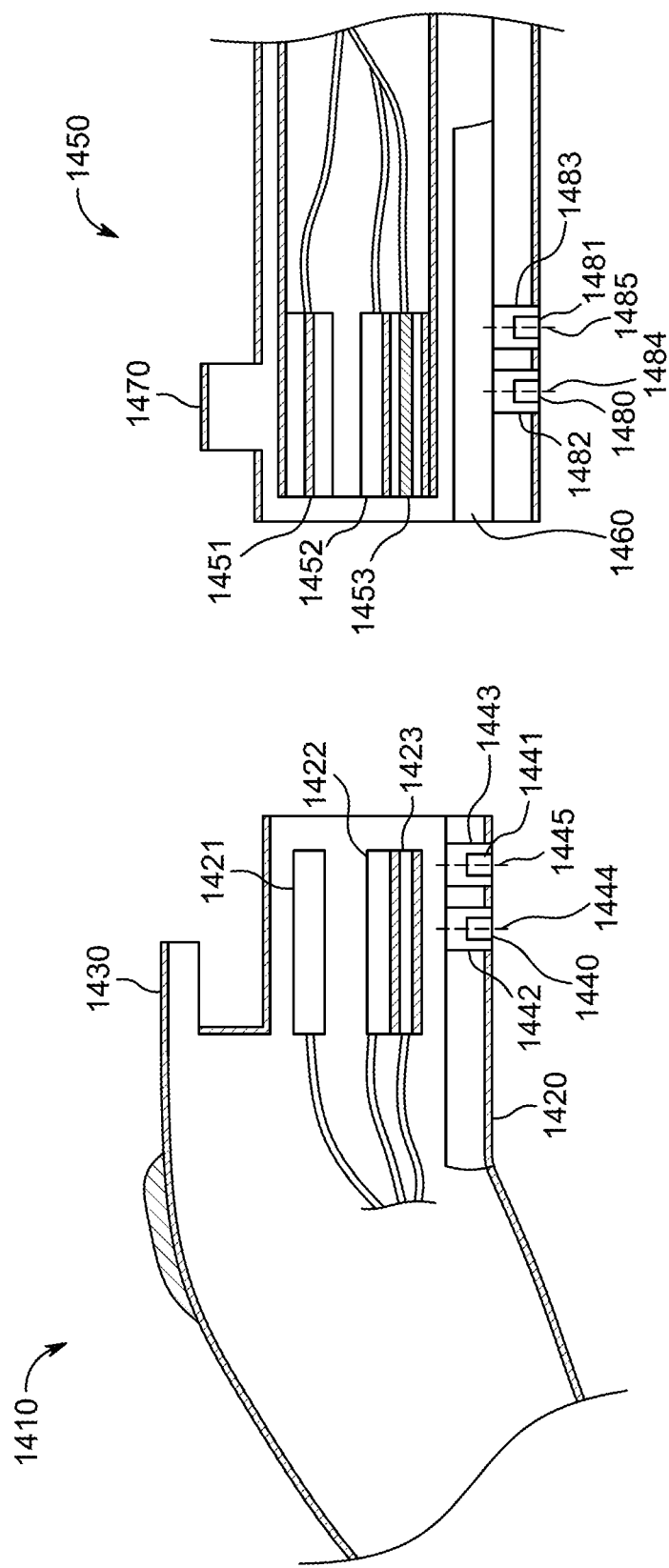
FIG. 15 shows illustrative cross-sectional views of the male and female connector assemblies, according to an embodiment.

FIG. 15 shows illustrative cross-sectional views of the male and female connector assemblies of FIG. 14. Male connector assembly 1410 can include connectors 1421-1423 that interface with connectors 1451-1453 of female connector assembly 1450 when assemblies 1410 and 1450 are coupled together. Male connector assembly 1410 can include CCUs 1441 and 1440 that are mounted within rectangular member 1420. A combination of RF shielding and/or signal guiding structures 1442 and 1443 may be associated with each of CCUs 1440 and 1441. As explained above, RF shielding and/or signal guiding structures may direct and/or contain EFH signal energy to minimize stray radiation and cross-talk. The counterpart CCUs to CCUs 1440 and 1441 are CCUs 1480 and 1481, which are positioned below channel 1460. CCUs 1480 and 1481 may have RF shielding and/or signal guiding structures 1482 and 1483 associated therewith. When assemblies 1410 and 1450 are coupled together, CCU 1440 is aligned with CCU 1480 and CCU 1441 is aligned with CCU 1481. The alignment may be such that center axes 1444 and 1484 associated with CCUs 1440 and 1480 are co-aligned and that center axes 1445 and 1485 associated with CCUs 1441 and 1481 are co-aligned.

FIGS. 16A and 16B shows illustrative cross-sectional and top views of male and female connector assemblies 1610 and 1650. Connector assemblies 1610 and 1650 may be alternative versions of a J1772 standard connector. Male connector assembly 1610 can include connectors 1611-1613 that interface with connectors 1651-1653 of female connector assembly 1650 when assemblies 1410 and 1450 are coupled together. Male connector assembly 1610 can include latch 1630 that engages with latch member 1670 of female connector assembly 1650. Male connector assembly 1610 can include rectangular member 1620 that slots into channel 1660 when assemblies 1610 and 1650 are coupled together. CCUs 1640 and 1641 may be contained within latch 1630 as shown, and CCUs 1680 and 1681 may be contained with latch member 1670. RF shielding/signal guiding structures 1643, 1644, 1683, and 1684 may be used in connection with CCUs, 1640, 1641, 1680, and 1681, respectively. When assemblies 1610 and 1650 are coupled together, CCU 1640 is aligned with CCU 1680 and CCU 1641 is aligned with CCU 1681. The placement of the CCUs in latch 1630 and latch member 1670 can ensure that the CCUs are perfectly aligned each time assemblies 1610 and 1650 are coupled together.

FIGS. 17A and 17B shows illustrative front and top views of male and female connector assemblies that adhere to a type 2 electric vehicle charging plug standard, according to an embodiment. Male connector assembly 1710 may be associated with a charging station and female connector assembly 1750 may be associated with a vehicle. As shown, both connector assemblies include connectors 1711 and 1751 that mate with each other when both assemblies are coupled together. Connector assemblies 1710 and 1750 are keyed such that they can only be coupled in one orientation each time they are connected together. This fixed orientation provides a recipe for integrating CCUs therein so that contactless links are formed each time the assemblies are coupled together.

Male connector assembly 1710 can include CCUs 1740 and 1741 contained within protrusion member 1720 and adjacent to various ones of the connectors 1711. Female connector assembly 1750 can include CCUs 1780 and 1781 contained within body 1770, but outside of cavity 1771. Not shown in FIGS. 17A and 17B is the inclusion of RF shielding/signal guiding structures that are associated with each CCU, but it should be appreciated that such structures can be associated with each CCU to assist in containing and directing EHF signal energy. When male connector assembly 1710 is inserted into female connector assembly 1750, protrusion member 1720 fits inside cavity 1771, and when protrusion member 1720 is pressed all the way in, CCU 1740 is aligned with CCU 1780 and CCU 1741 is aligned with CCU 1781.

Figure 18:
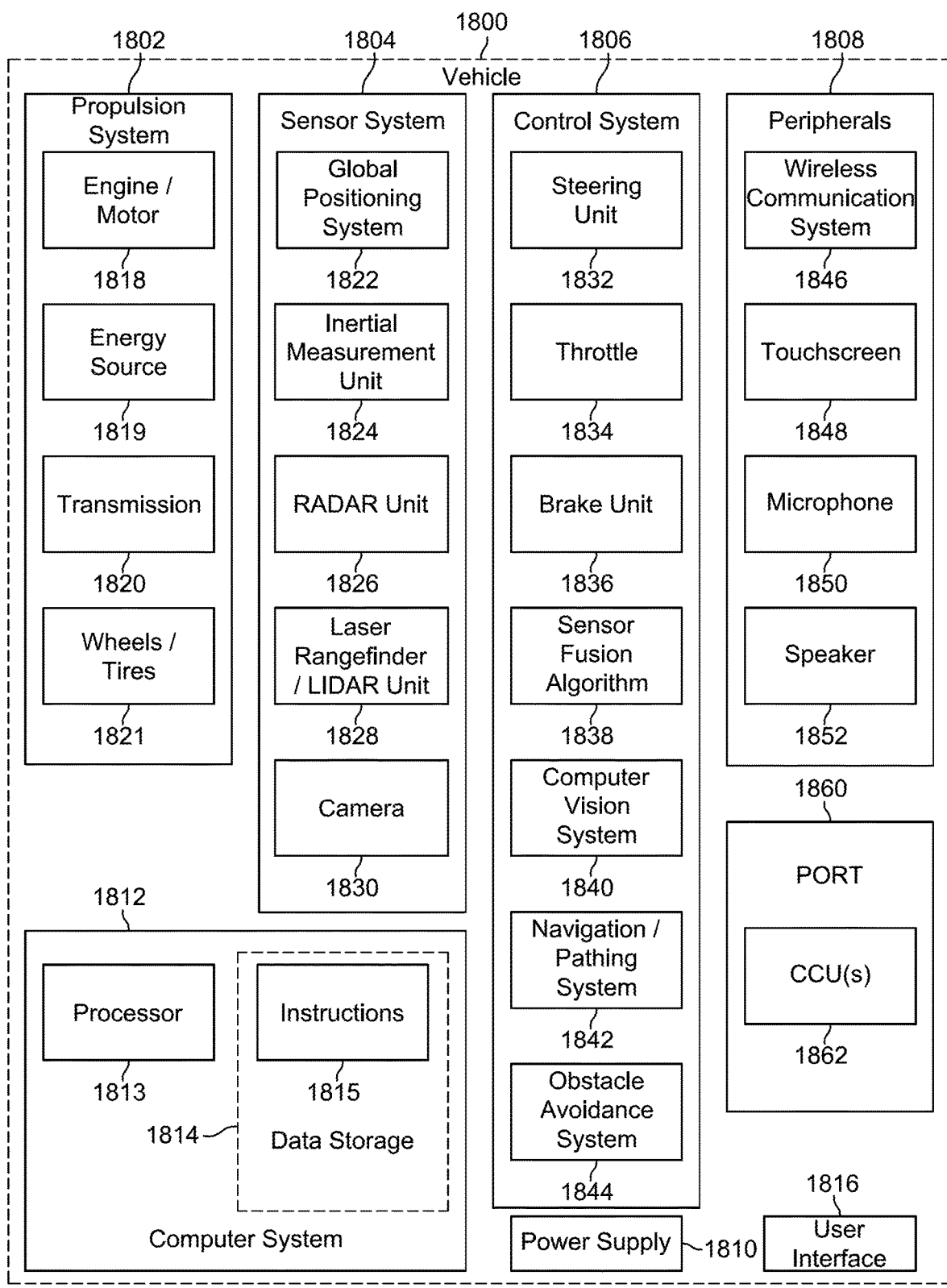
FIG. 18 is a functional block diagram illustrating a vehicle system, according to an embodiment.

FIG. 18 is a functional block diagram illustrating a vehicle system 1800, according to an example embodiment. Vehicle 1800 can be configured to operate fully or partially in an autonomous mode. For example, vehicle 1800 can control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control vehicle 1800 based on the determined information. While in autonomous mode, the vehicle 1800 may be configured to operate without human interaction.

In some embodiments, vehicle 1800 can operate under solely control of a human operator, but the various sensors and systems of the vehicle and the road conditions (e.g., road and the path traveled, other vehicles, stop signs, traffic lights, various events occurring outside of the vehicle) can be monitored and recorded.

Vehicle 1800 can include various subsystems such as a propulsion system 1802, a sensor system 1804, a control system 1806, one or more peripherals 1808, as well as a power supply 1810, a computer system 1812, and a user interface 1816. Vehicle 1800 may include more or fewer subsystems and each subsystem can include multiple elements. Further, each of the subsystems and elements of vehicle 1800 can be interconnected. Thus, one or more of the described functions of the vehicle 1800 may be divided up into additional functional or physical components, or combined into fewer functional or physical components. In some further examples, additional functional and/or physical components may be added to the examples illustrated by FIG. 18.

Propulsion system 1802 may include components operable to provide powered motion for the vehicle 1800. Depending upon the embodiment, the propulsion system 1802 can include an engine/motor 1818, an energy source 1819, a transmission 1820, and wheels/tires 1821. The engine/motor 1818 can be any combination of an internal combustion engine, an electric motor, steam engine, Stirling engine, or other types of engines and/or motors. In some embodiments, the engine/motor 1818 may be configured to convert energy source 1819 into mechanical energy. In some embodiments, the propulsion system 1802 can include multiple types of engines and/or motors. For instance, a gas-electric hybrid car can include a gasoline engine and an electric motor. Other examples are possible.

Energy source 1819 can represent a source of energy that may, in full or in part, power the engine/motor 1818. That is, the engine/motor 1818 can be configured to convert the energy source 1819 into mechanical energy. Examples of energy sources 1819 include gasoline, diesel, other petroleum-based fuels, propane, other compressed gas-based fuels, ethanol, solar panels, batteries, and other sources of electrical power. The energy source(s) 1819 can additionally or alternatively include any combination of fuel tanks, batteries, capacitors, and/or flywheels. The energy source 1819 can also provide enemy for other systems of the vehicle 1800.

Transmission 1820 can include elements that are operable to transmit mechanical power from the engine/motor 1818 to the wheels/tires 1821. To this end, the transmission 1820 can include a gearbox, clutch, differential, and drive shafts. The transmission 1820 can include other elements. The drive shafts can include one or more axles that can be coupled to the one or more wheels/tires 1821.

Wheels/tires 1821 of vehicle 1800 can be configured in various formats, including a unicycle, bicycle/motorcycle, tricycle, or car/truck four-wheel format. Other wheel/tire geometries are possible, such as those including six or more wheels. Any combination of the wheels/tires 1821 of vehicle 1800 may be operable to rotate differentially with respect to other wheels/tires 1821. The wheels/tires 1821 can represent at least one wheel that is fixedly attached to the transmission 1820 and at least one tire coupled to a rim of the wheel that can make contact with the driving surface. The wheels/tires 1821 can include any combination of metal and rubber, or another combination of materials.

Sensor system 1804 may include a number of sensors configured to sense information about an environment of the vehicle 1800. For example, the sensor system 1804 can include a Global Positioning System (GPS) 1822, an inertial measurement unit (IMU) 1824, a RADAR unit 1826, a laser rangefinder/LIDAR unit 1828, and a camera 1830. The sensor system 1804 can also include sensors configured to monitor internal systems of the vehicle 1800 (e.g., O2 monitor, fuel gauge, engine oil temperature). Other sensors are possible as well.

One or more of the sensors included in sensor system 1804 can be configured to be actuated separately and/or collectively in order to modify a position and/or an orientation of the one or more sensors.

GPS 1822 may be any sensor configured to estimate a geographic location of the vehicle 1800. To this end, GPS 1822 can include a transceiver operable to provide information regarding the position of the vehicle 1800 with respect to the Earth.

IMU 1824 can include any combination of sensors (e.g., accelerometers and gyroscopes) configured to sense position and orientation changes of the vehicle 1800 based on inertial acceleration.

RADAR unit 1826 may represent a system that utilizes radio signals to sense objects within the local environment of the vehicle 1800. In some embodiments, in addition to sensing the objects, the RADAR unit 1826 may additionally be configured to sense the speed and/or heading of the objects. Similarly, laser rangefinder or LIDAR unit 1828 may be any sensor configured to sense objects in the environment in which the vehicle 1800 is located using lasers. Depending upon the embodiment, the laser rangefinder/LIDAR unit 1828 can include one or more laser sources, a laser scanner, and one or more detectors, among other system components. The laser rangefinder/LIDAR unit 1828 can be configured to operate in a coherent (e.g., using heterodyne detection) or an incoherent detection mode.

Camera 1830 can include one or more devices configured to capture a plurality of images of the environment of vehicle 1800. Camera 1830 can be a still camera or a video camera.

Control system 1806 may be configured to control operation of vehicle 1800 and its components. Accordingly, control system 1806 can include various elements include steering unit 1832, throttle 1834, brake unit 1836, a sensor fusion algorithm 1838, a computer vision system 1840, a navigation/bathing system 1842, and an obstacle avoidance system 1844.

Steering unit 1832 can represent any combination of mechanisms that may be operable to adjust the heading of vehicle 1800. Throttle 1834 can be configured to control, for instance, the operating speed of the engine/motor 1818 and, in turn, control the speed of the vehicle 1800. Brake unit 1836 can include any combination of mechanisms configured to decelerate the vehicle 1800. Brake unit 1836 can use friction to slow wheels/tires 1821. In other embodiments, the brake unit 1836 can convert the kinetic energy of wheels/tires 1821 to electric current. The brake unit 1836 may take other forms as well. The brake unit 1836 may control braking of the vehicle 1800, for example, using a braking algorithm that takes into account input from one or more units of the sensor system 1804.

Sensor fusion algorithm 1838 may be an algorithm (or a computer program product storing an algorithm) configured to accept data from the sensor system 1804 as an input. The data may include, for example, data representing information sensed at the sensors of the sensor system 1804. The sensor fusion algorithm 1838 can include, for instance, a Kalman filter, Bayesian network, or other algorithm. The sensor fusion algorithm 1838 can further provide various assessments based on the data from sensor system 1804. Depending upon the embodiment, the assessments can include evaluations of individual objects and/or features in the environment of vehicle 1800, evaluation of a particular situation, and/or evaluate possible impacts based on the particular situation. Other assessments are possible.

Computer vision system 1840 may be any system operable to process and analyze images captured by camera 1830 in order to identify objects and/or features in the environment of vehicle 1800 that can include traffic signals, road way boundaries, and obstacles. Computer vision system 1840 can use an object recognition algorithm, a Structure From Motion (SFM) algorithm, video tracking, and other computer vision techniques. In some embodiments, the computer vision system 1840 can be additionally configured to map an environment, track objects, estimate the speed of objects, etc.

Navigation and pathing system 1842 may be any system configured to determine a driving path for the vehicle 1800, for example, by referencing navigation data such as geographical or map data. The navigation and pathing system 1842 may additionally be configured to update the driving path dynamically while the vehicle 1800 is in operation. In some embodiments, the navigation and pathing system 1842 can be configured to incorporate data from the sensor fusion algorithm 1838, the GPS 1822, and one or more predetermined maps so as to determine the driving path for vehicle 1800. Obstacle avoidance system 1844 can represent a control system configured to identify, evaluate, and avoid or otherwise negotiate potential obstacles in the environment of the vehicle 1800. Control system 1806 may additionally or alternatively include components other than those shown and described.

Peripherals 1808 may be configured to allow interaction between the vehicle 1800 and external sensors, other vehicles, other computer systems, and/or a user. For example, peripherals 1808 can include a wireless communication system 1846, a touchscreen 1848, a microphone 1850, and/or a speaker 1852. In an example embodiment, peripherals 1808 can provide, for instance, means for a user of the vehicle 1800 to interact with the user interface 1816. To this end, touchscreen 1848 can provide information to a user of vehicle 1800. User interface 1816 can also be operable to accept input from the user via the touchscreen 1848. The touchscreen 1848 may be configured to sense at least one of a position and a movement of a user's finger via capacitive sensing, resistance sensing, or a surface acoustic wave process, among other possibilities. Touchscreen 1848 may be capable of sensing finger movement in a direction parallel or planar to the touchscreen surface, in a direction normal to the touchscreen surface, or both, and may also be capable of sensing a level of pressure applied to the touchscreen surface. Touchscreen 1848 may be formed of one or more translucent or transparent insulating layers and one or more translucent or transparent conducting layers. Touchscreen 1848 may take other forms as well.

In other instances, peripherals 1808 may provide means for the vehicle 1800 to communicate with devices within its environment. Microphone 1850 may be configured to receive audio (e.g., a voice command or other audio input) from a user of vehicle 1800. Similarly, speakers 1852 may be configured to output audio to the user of vehicle 1800.

In one example, wireless communication system 1846 can be configured to wirelessly communicate with one or more devices directly or via a communication network. For example, wireless communication system 1846 can use 3G cellular communication, such as CDMA, EVDO, GSM/GPRS, or 4G cellular communication, such as WiMAX or LTE. Alternatively, wireless communication system 1846 can communicate with a wireless local area network (FLAN), for example, using WiFi. In some embodiments, wireless communication system 1846 can communicate directly with a device, for example, using an infrared link, Bluetooth, or ZigBee. Other wireless protocols, such as various vehicular communication systems, are possible within the context of the disclosure. For example, the wireless communication system 1846 can include one or more dedicated short range communications (DSRC) devices that can include public and/or private data communications between vehicles and/or roadside stations.

Power supply 1810 may provide power to various components of vehicle 1800 and can represent, for example, a rechargeable lithium-ion or lead-acid battery. In some embodiments, one or more banks of such batteries can be configured to provide electrical power. Other power supply materials and configurations are possible. In some embodiments, the power supply 1810 and energy source 1819 can be implemented together, as in some all-electric cars.

Many or all of the functions of vehicle 1800 can be controlled by computer system 1812. Computer system 1812 may include at least one processor 1813 (which can include at least one microprocessor) that executes instructions 1815 stored in a non-transitory computer readable medium, such as the data storage 1814. Computer system 1812 may also represent a plurality of computing devices that may serve to control individual components or subsystems of the vehicle 1800 in a distributed fashion.

In some embodiments, data storage 1814 may contain instructions 1815 (e.g., program logic) executable by processor 1813 to execute various functions of vehicle 1800, including those described above in connection with FIG. 18. In some embodiments, processor 1813 may be operative to run an artificial intelligence (AI) engine, for example, to control the various systems of the vehicle 1800. Data storage 1814 may contain additional instructions as well, including instructions to transmit data to, receive data from, interact with, and/or control one or more of propulsion system 1802, sensor system 1804, control system 1806, and peripherals 1808. In addition to instructions 1815, data storage 1814 may store data such as roadway maps, path information, among other information. Such information may be used by vehicle 1800 and computer system 1812 at during the operation of vehicle 1800 in the autonomous, semi-autonomous, and/or manual modes.

Vehicle 1800 may include a user interface 1816 for providing information to or receiving input from a user of vehicle 1800. User interface 1816 can control or enable control of content and/or the layout of interactive images that can be displayed on the touchscreen 1848. Further, user interface 1816 can include one or more input/output devices within the set of peripherals 1808, such as wireless communication system 1846, touchscreen 1848, microphone 1850, and the speaker 1852.

Port 1860 may be a port through which vehicle 1800 receives power to charge power supply 1810 and to communicate data stored in data store 1814 via CCUs 1862. Port 1860 may be similar to port 1360, connector assembly 1450, connector assembly 1650, connector assembly 1750, as discussed above.

Computer system 1812 may control the function of vehicle 1800 based on inputs received from various subsystems (e.g., propulsion system 1802, sensor system 104, and control system 1806), as well as from user interface 1816. For example, computer system 1812 may utilize input from control system 1806 in order to control steering unit 1832 to avoid an obstacle detected by sensor system 1804 and obstacle avoidance system 1844. Depending upon the embodiment, computer system 1812 can be operable to provide control over many aspects of vehicle 1800 and its subsystems.

The components of vehicle 1800 can be configured to work in an interconnected fashion with other components within or outside their respective systems. For instance, in an example embodiment, camera 1830 can capture a plurality of images that can represent information about a state of an environment of vehicle 1800 operating in an autonomous or manual mode. The environment can include every conceivable type of data that can be observed and collected by vehicle 1800. For example, the environment can include the road and all aspects associated with the road such as temperature, composition of the road (e.g., concrete or asphalt), moisture level, lanes, curbs, turn lanes, cross walks, stop lights, stop signs, yield signs and other traffic signs, and barricades. The environment can include objects such as other vehicles, people, random debris in or adjacent to the road.

Computer system 1812 can monitor and log the environmental inputs in conjunction with operational states of the vehicle. The operational states can refer to operational and control parameters of the vehicle such as speed, trajectory, steering input, acceleration input, and brake input, and also can include results of driver input or AI driver input. This way, regardless of whether the vehicle is operating in autonomous mode or under human control, computer system 1812 can simultaneously log the environmental inputs and the operational states to provide a comprehensive vehicle log.

The vehicle log data acquired from the vehicle using embodiments discussed herein can be used in a number of different ways. For example, the vehicle log data and results from either manual driving data or autonomous driving data that is contains can be used to train vehicle AI offline based on actual recorded data and actual decisions made and the results of those decisions. The vehicle log data from one vehicle may include data pertaining to hundreds, thousands, or hundreds of thousands of driving miles. Thus, the data acquired from just one vehicle is a relatively rich environment for training vehicle AI. The training data may be further enriched by aggregating vehicle log data from numerous vehicles and users, thus providing additional resources for training and improving vehicle AI. The aggregated vehicle log data can represent hundreds of thousands, millions, or an ever increasing number of trips, across various road conditions and driving situations, and the actions taken in response thereto that can be used to train the AI.

In addition, the AI training can occur offline and not during real driving conditions. This way, the vehicle AI can run simulations based on the aggregated vehicle logs to without having to actually drive the vehicle. In some embodiments, the vehicle AI may be fed road conditions and driving situations as inputs, and the results performed by the vehicle AI may be compared to the actual results stored in the log. The vehicle AI can be trained based on a comparison of the results.

The vehicle log data, which includes sensor specific data gathered during a trip as well as all of the decisions and outcomes of those decisions, can be part of the information that the vehicle AI uses to train. In some embodiments, the results of the AI training can include what sensors are needed in the vehicle (and where they are located) and what sensors are not. For example, AI training can be performed with log data having a sensor (e.g., camera) in a first location on the vehicle and a second location on the vehicle. The results of AI driving performance based on both sensor locations can be compared and decisions can be made as to which sensor configuration yields the better result. This sensor based training can be used to evaluate an infinite number of sensor configurations, and the vehicle AI can be tuned to work with one or more of those sensor configurations.

The aggregate vehicle log data may be used to provide additional information regarding the wear and tear on vehicles overall. For example, if the brakes are worn down to 30% of normal, the vehicle log data can reflect how the vehicle reacts when these brakes are applied. The vehicle AI can be trained to take wear and tear into account and can adjust vehicle operation to compensate for that wear and tear. For example, the vehicle AI may cause the brakes to be applied earlier if the brake wear is below a certain threshold.

The vehicle log data, which may contain serval gigabytes or terabytes of data, can be transferred to a remote server (not shown) for further analysis. For example, the log may be transferred from data storage 1814 to data storage associated with a charging station via a contactless link established by CCUs 1862 and their counterpart CCUs in the charging station when the vehicle is connected to the charging station. The charging station can then transfer the log to the remote server.

The remote server may include an autonomous vehicle driving platform that can apply analytics (e.g., similar to some of the examples discussed above) to the log. The autonomous vehicle driving platform (AVDP) may include one or more algorithms capable of autonomously controlling operation of a vehicle. In one embodiment, the AVDP may assess the log to determine whether any updates or modifications are needed for the one or more algorithms to improve autonomous vehicle operation. In another embodiment, the AVDP may use the log to build one or more algorithms that can autonomously control operation of a vehicle. In yet another embodiment, the AVDP run simulations using the environmental inputs received in the log and compare the simulation results to the actual monitored actions of the vehicle (which are also included in the log).

Although FIG. 18 shows various components of vehicle 1800, i.e., wireless communication system 1846, computer system 1812, data storage 1814, and user interface 1816, as being integrated into vehicle 1800, one or more of these components can be mounted or associated separately from the vehicle 1800. For example, data storage 1814 can, in part or in full, exist separate from vehicle 1800. Thus, vehicle 1800 can be provided in the form of device elements that may be located separately or together. The device elements that make up vehicle 1800 can be communicatively coupled together in a wired and/or wireless fashion.

Embodiments discussed herein refer to using CCUs that are integrated into a power charging port to access data that is stored on the vehicle and/or to provide data to the vehicle. The data storage (e.g., data storage 1370 or data storage 1814) may be embodied in a permanently embedded storage system within the vehicle that cannot be removed (or it can only be removed after extensive labor is employed to disassemble part of the vehicle to gain physical access to the embedded storage system. The contactless communications path established between the charging port and the vehicle port provide a high speed, robust, and reliable data connection for transferring data to/from the vehicle.

The data storage in the vehicle may operate in different modes. For example, in one embodiment, the data storage may be used in a vehicle mode. In the vehicle mode, the vehicle may use the data storage to perform vehicle functions such as, for example, autonomous driving, data collection (e.g., logging the environmental inputs in conjunction with operational states of the vehicle), and media playback (e.g., playing back music or movies). When operating in the vehicle mode, the data storage may operate in an internal access only mode in which only the vehicle is permitted to access content on the data storage and no external device may be permitted to access the data storage.

The data storage may be used in an external access mode. In the external access mode, a device or system other than the vehicle may access the data storage contained in the vehicle using a port according to various embodiments discussed herein. The external system may be required to authenticate itself to the vehicle before it is granted access to the data storage. The degree to which the external system has access to the data storage may depend on its authorization level. For example, different external systems may have access to different sets of data stored on the data storage. As a specific example, a law enforcement system may be granted access to a vehicle driving history. As another specific example, a service system may be granted access to service and diagnostics data in the data storage. As yet another specific example, a vendor authorized system (such as a vendor that has licensed or received approval from the manufacturer of the vehicle) may have ultimate access to all data contained in the data storage and may also have the ability to write data to the data storage.

Figure 19:
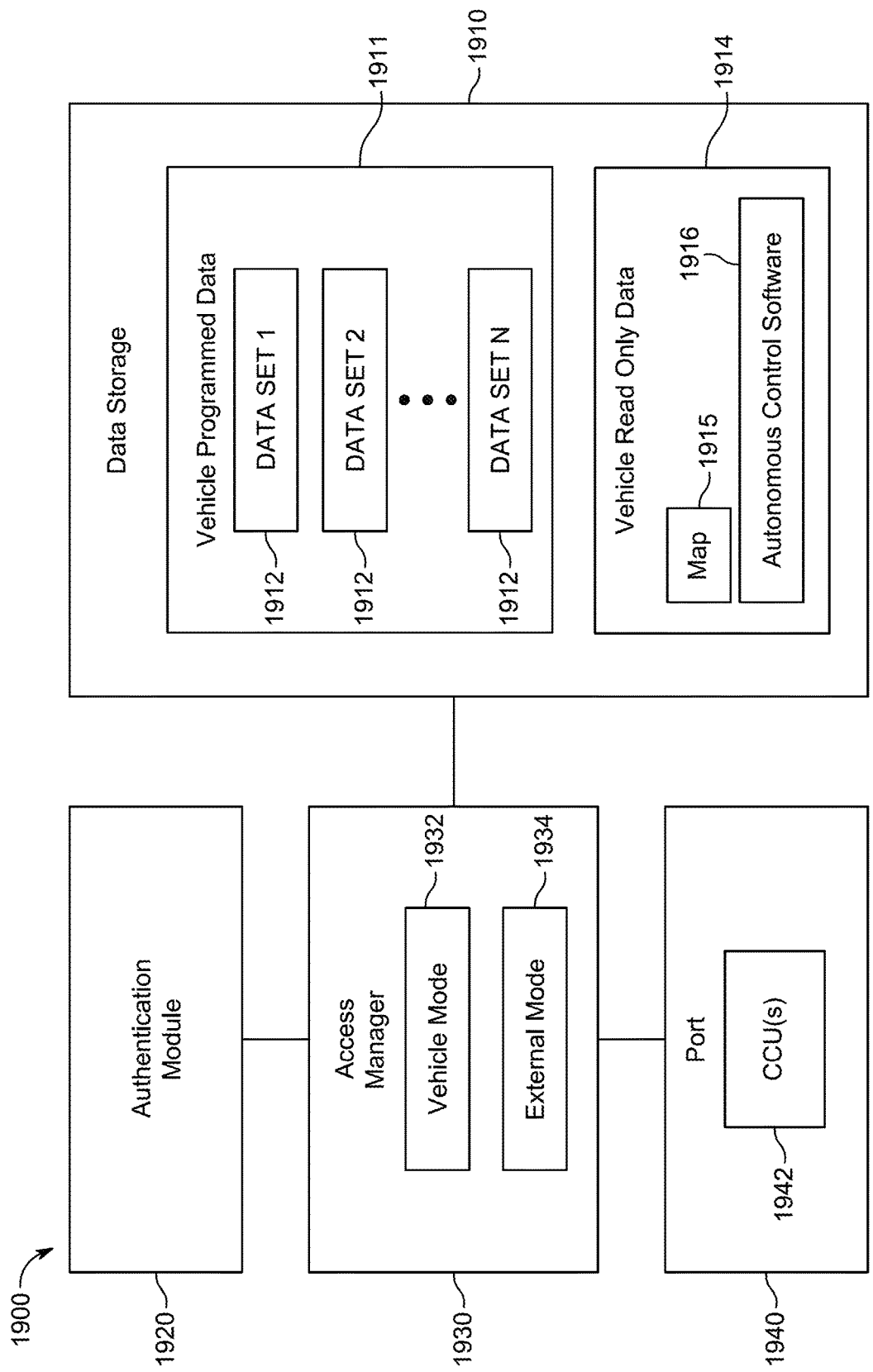
FIG. 19 shows an illustrative block diagram of a portion of vehicle pertaining to usage of data storage, according to an embodiment.

FIG. 19 shows an illustrative block diagram of a portion of vehicle 1900 pertaining to usage of data storage, according to an embodiment. As shown, FIG. 19 includes data storage 1910, authentication module 1920, access manager 1930, and port 1940. Data storage 1910 may include vehicle program data 1911 and vehicle read only data 1914. Vehicle programmed data 1911 may represent data that is collected and/or performed by the vehicle and that is programmed in data storage 1910. For example, vehicle programmed data may include environmental data and operational state data. The programmed data may be attributed to one or more data sets 1912 (shown as data set 1, data set 2, and data sent n). Each data set 1912 may be associated with an access level. Thus, depending on the credential of an external system accessing vehicle via port 1940, access manager 1930 may grant access to one or more data sets 1912. Vehicle read only data 1914 may include data is used by vehicle during its operation and is not data that can be overwritten by the vehicle. For example, read only data may include automation data such as map data 1915 (e.g., for a navigation system) and autonomous control software 1916 (e.g., firmware for controlling autonomous vehicle operation, AI engine, braking algorithms). In some embodiments, vehicle read only data 1914 may be updated by the external system, provided that the external system has proper authentication and access. For example, the external system may update map data 1915 or control software 1916.

Authentication module 1920 may be operative to authenticate the external system coupled to port 1940. Authentication may be required to safeguard access to data contained in data storage 1910. Port 1940 can be any port that embodies teaching as discussed above and that include CCUs 1942.

Access manager 1930 may control the mode of operation in which data storage is 1910 is used and determine level of access to data sets 1912. The modes operation can include vehicle mode 1932 and external mode 1934. Access manager 1930 may switch between modes depending on whether an external system is coupled to port 1940. For example, when no external system is coupled to port 1940, access manager 1930 may place data storage 1910 in a mode in which only the vehicle can access the data contained therein. The vehicle only mode can be a safeguard for protecting data storage from unauthorized access against, for example, snooping systems that attempt to gain access to data storage through wireless communications via the vehicle's Bluetooth radio or WIFI radio.

When an external system is coupled to port 1940, access manager 1930 may place data storage in external access mode 1934. In this mode, access manager 1930 may grant selective access to programmed data 1911 and read only data 1914. The level of access may be determined based on the authentication of the external device. For example, a first external device may be granted access to data set 1 of programmed data 1911, but no access to read only data 1914. As another example, a second device may be granted to all data sets of programmed data 1911 and to read only data 1914.

Figure 20:
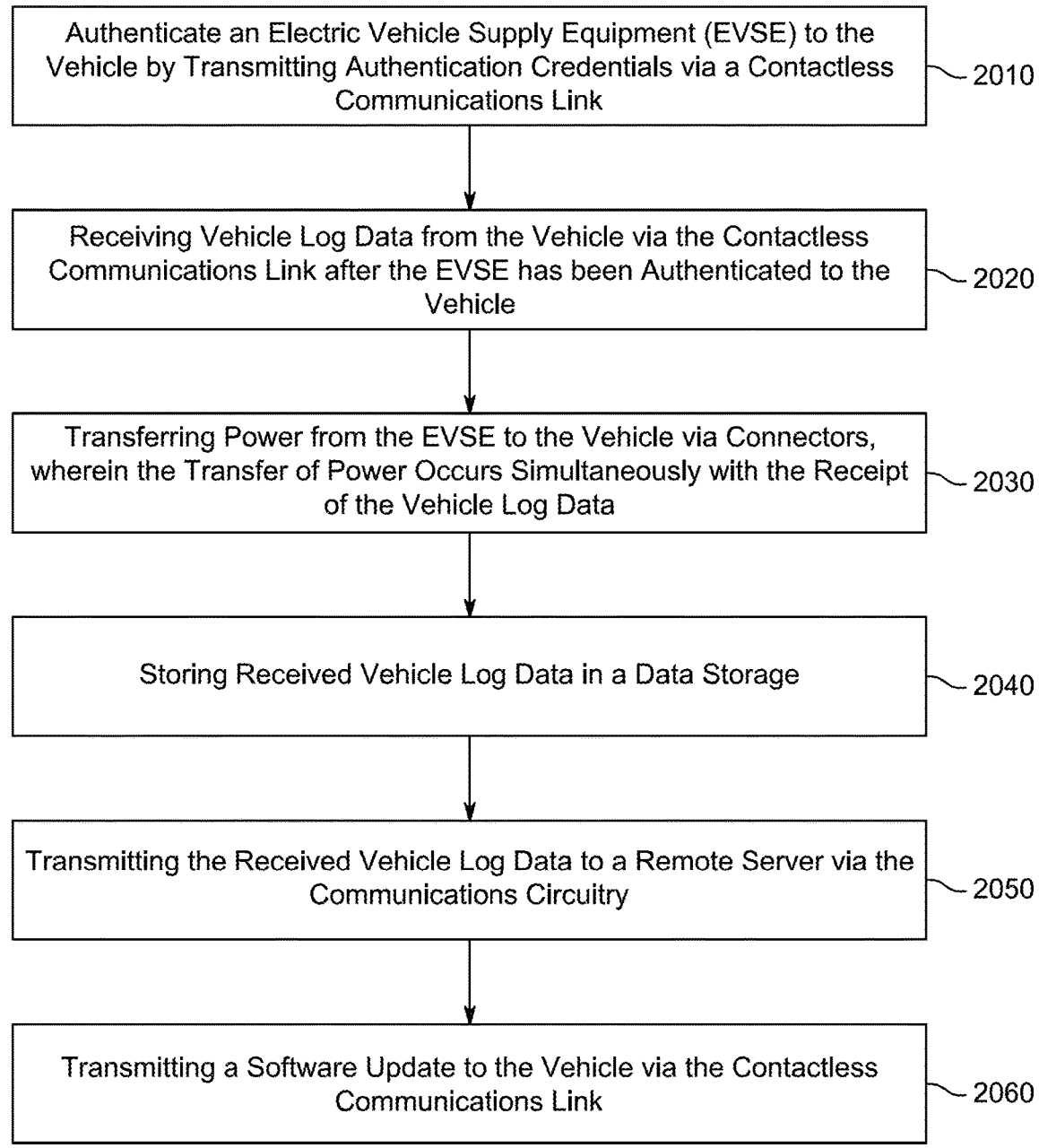
FIG. 20 shows an illustrative process according to an embodiment.

FIG. 20 shows an illustrative process 2000 according to an embodiment. Process 2000 may be implemented in an EVSE that is designed to be coupled to a vehicle. The EVSE can include, for example, communications circuitry, data storage, control circuitry, and a first port connector operative to interface with a second port connector associated with the vehicle. The first connector can include a housing having a keyed outer surface that limits the interface between the first port connector and the second port connection to one orientation, several connectors operative to mechanically couple to a plurality of counterpart connectors in the second port connector, and at least one CCU that establishes a contactless communications link with a respective one of the at least one CCU of the second port connector when the first and second port connectors are coupled together. After the first and second port connectors are coupled together, the control circuitry can implement process 2000 starting at step 2010. At step 2010, the EVSE may be authenticated to the vehicle by transmitting authentication credentials via the contactless communications link to the vehicle. At step 2020, vehicle log data is received from the vehicle via the contactless communications link after the EVSE has been authenticated to the vehicle. At step 2030, power can to be transferred from the EVSE to the vehicle via the plurality of connectors, wherein the transfer of power occurs simultaneously with the receipt of the vehicle log data. At step 2040, the received vehicle log data can be stored in the data storage, and step 2050, the received vehicle log data can be transmitted to a remote server via the communications circuitry. At step 2060, a software update can be transmitted to the vehicle via the contactless communications link.

It should be appreciated that the steps shown in FIG. 20 are merely illustrative and that the order of the steps may be rearranged, steps may be added, and steps may be omitted.

Figure 21:
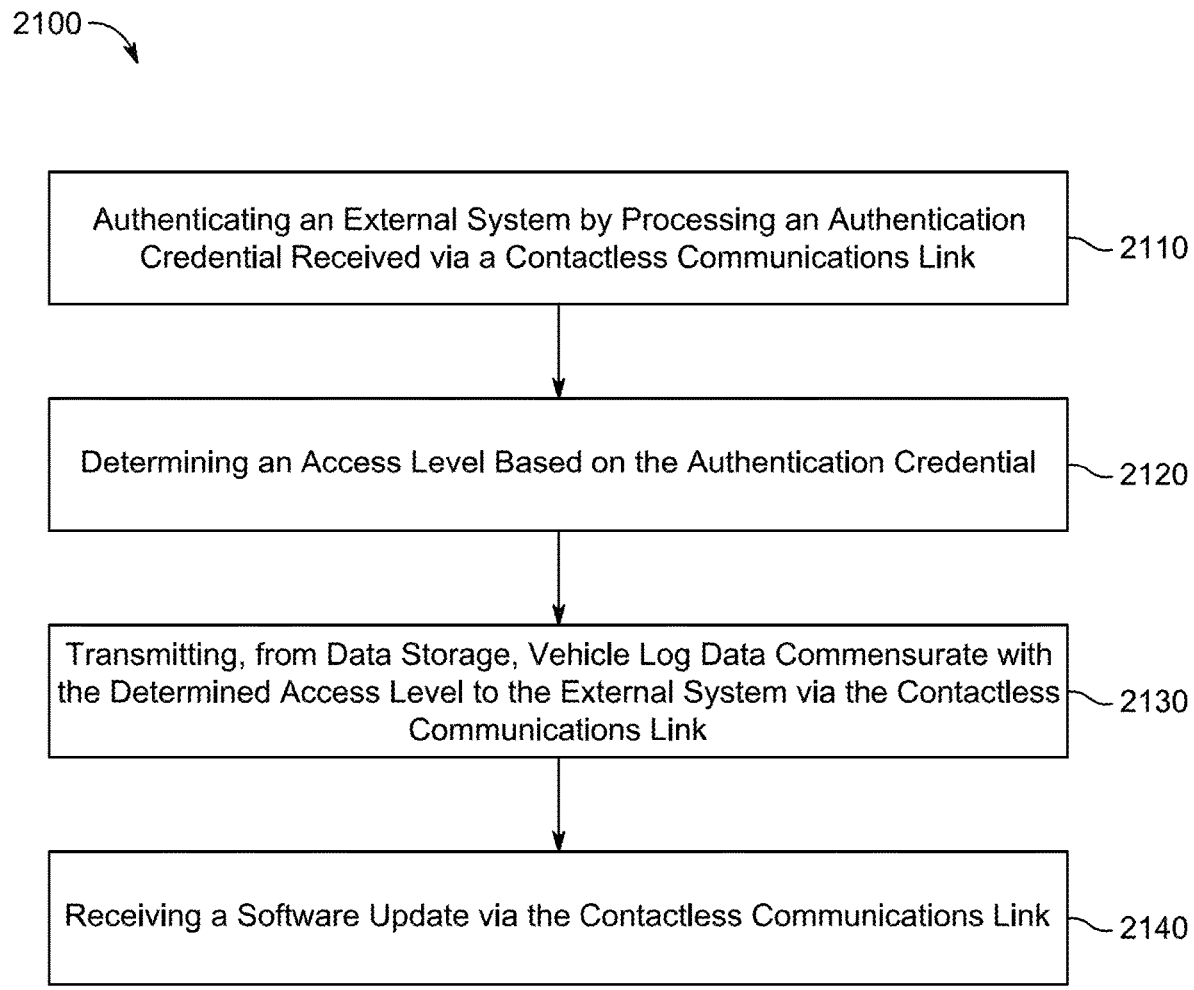
FIG. 21 shows another illustrative process according to an embodiment.

FIG. 21 shows an illustrative process 2100 according to an embodiment. Process 2100 may be implemented in an electric vehicle are may be implemented as part of an electronics package that can be integrated into the vehicle. The vehicle can include sensors, system components, data storage, control circuitry, and a first port connector operative to interface with a second port connector associated with an external system. The external system can be an ESVE, a law enforcement port, a service and diagnostic port, or any other suitable port. The first port can include a housing having a keyed outer surface that limits the interface between the first port connector and the second port connection to one orientation, connectors operative to mechanically couple to a plurality of counterpart connectors in the second port connector, and at least one CCU that establishes a contactless communications link with a respective one of the at least one CCU of the second port connector when the first and second port connectors are coupled together. After the first and second port connectors are coupled together, the control circuitry can implement process 2100 starting at step 2110. At step 2110, the external system can be authenticated by processing an authentication credential received via the contactless communications link. At step 2120, an access level can be determined based on the authentication credential. At step 2130, vehicle log data commensurate with the determined access level can be transmitted, from the data storage, to the external system via the contactless communications link. The vehicle log data can be transmitted from the data storage via the contactless communications link simultaneously with a receipt of power, from the external system, via the connectors. At step 2140, a software update may be received via the contactless communications link.

It should be appreciated that the steps shown in FIG. 21 are merely illustrative and that the order of the steps may be rearranged, steps may be added, and steps may be omitted. For example, process 2100 may engage a vehicle only mode for the data storage when the first and second port connectors are not connected together. As another example, process 2100 can engage an external access mode for the data storage when the first and second port connectors are connected together and the external system has been authenticated.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-23, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method comprising:
   interconnecting a first port connector associated with an electric vehicle supply equipment (EVSE) with a second port connector associated with a vehicle, the first connector comprising:
   a housing having a keyed outer surface that limits the interface between the first port connector and the second port connector to one orientation;
   one or more connectors operative to mechanically couple to one or more counterpart connectors in the second port connector; and
   at least one contactless communication unit (CCU) that establishes a contactless communications link with a respective one of the at least one CCU of the second port connector when the first and second port connectors are coupled together, and wherein the interface orientation between the first and second port connectors ensures that the at least one CCU associated with the first port connector and the respective one of the at least one CCU associated with the second port connector are aligned with respect to each other to enable establishment of the contactless communications link when the first and second port connectors are coupled together, wherein after the first and second port connectors are coupled together:
   authenticating the EVSE with the vehicle by transmitting authentication credentials via the contactless communications link to the vehicle;
   receiving vehicle log data from the vehicle via the contactless communication link after the EVSE has been authenticated to the vehicle;
   storing the received vehicle log data in a data storage; and
   transmitting the received vehicle log data to a remote server.

2. The method of claim 1, further comprising transferring power from the EVSE to the vehicle via a connector coupled to the vehicle, wherein the transfer of power occurs simultaneously with receipt of the vehicle log data.

3. The method of claim 1, further comprising transmitting a software update to the vehicle via the contactless communications link.

4. The method of claim 1, wherein the vehicle log data comprises environmental inputs collected by the vehicle during driving events.

5. The method of claim 4, wherein the environmental inputs comprise data collected by at least one sensor associated with the vehicle.

6. The method of claim 1, wherein the vehicle log data comprises operational states executed by the vehicle during driving events.

7. The method of claim 6, wherein the operational states comprise one of driver or autonomous control inputs to control the vehicle.

8. The method of claim 1, wherein the vehicle log data is operative to serve as a data set for autonomous vehicle software analytics.

9. A method managing data contained by a vehicle, comprising:
   interconnecting a first port connector associated with an external system with a second port connector associated with a vehicle, the first connector comprising:
   a housing having a keyed outer surface that limits the interface between the first port connector and the second port connector to one orientation;
   one or more connectors operative to mechanically couple to one or more counterpart connectors in the second port connector; and
   at least one contactless communication unit (CCU) that establishes a contactless communications link with a respective one of the at least one CCU of the second port connector when the first and second port connectors are coupled together, and wherein the interface orientation between the first and second port connectors ensures that the at least one CCU associated with the first port connector and the respective one of the at least one CCU associated with the second port connector are aligned with respect to each other to enable establishment of the contactless communications link when the first and second port connectors are coupled together, wherein after the first and second port connectors are coupled together:
   authenticating the external system by processing an authentication credential received via the contactless communications link;
   determining an access level based on the authentication credential; and
   transmitting, from a data storage, vehicle log data commensurate with the determined access level to the external system via the contactless communications link.

10. The method of claim 9, further comprising receiving a software update via the contactless communications link.

11. The method of claim 9, wherein the external system is selected from electric vehicle supply equipment, a law enforcement system, and a service and diagnostic system.

12. The method of claim 9, further comprising receiving power from the external system via a connector coupled to the vehicle, wherein the receipt of power occurs simultaneously with transfer of the vehicle log data.

13. The method of claim 9, wherein the vehicle log data comprises environmental inputs collected by the vehicle during driving events.

14. The method of claim 13, wherein the environmental inputs comprise data collected by at least one sensor associated with the vehicle.

15. The method of claim 9, wherein the vehicle log data comprises operational states executed by the vehicle during driving events.

16. The method of claim 15, wherein the operational states comprise one of driver or autonomous control inputs to control the vehicle.

17. The method of claim 9, wherein the vehicle log data is operative to serve as a data set for autonomous vehicle software analytics.

18. The method of claim 9, wherein the vehicle log data is operative to serve as a data set for law enforcement.

\* \* \* \* \*